(12) United States Patent
Yoon et al.

(10) Patent No.: US 12,719,117 B2
(45) **Date of Patent: *Aug. 25, 2026**

(54) BATTERY CELL, AND BATTERY MODULE, BATTERY PACK AND VEHICLE INCLUDING THE SAME

(71) Applicant: LG Energy Solution, Ltd., Seoul (KR)

(72) Inventors: Kyoung-Soon Yoon, Daejeon (KR); Seok-Je Kim, Daejeon (KR); Yong-Tae Lee, Daejeon (KR); Hyun-Sang Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 808 days.

This patent is subject to a terminal disclaimer.

(21) Appl. No.: 17/963,710

(22) Filed: Oct. 11, 2022

(65) Prior Publication Data

US 2023/0291041 A1 Sep. 14, 2023

(30) Foreign Application Priority Data

Mar. 11, 2022 (KR) ........................ 10-2022-0031063
Jun. 14, 2022 (KR) ........................ 10-2022-0072394
Sep. 29, 2022 (KR) ........................ 10-2022-0124534

(51) Int. Cl.
*H01M 50/178* (2021.01)
*H01M 50/105* (2021.01)
(Continued)

(52) U.S. Cl.
CPC ....... *H01M 50/178* (2021.01); *H01M 50/105* (2021.01); *H01M 50/14* (2021.01);
(Continued)

(58) Field of Classification Search
CPC ............. H01M 50/178; H01M 50/531; H01M 50/105; H01M 50/14; H01M 2220/20
See application file for complete search history.

(56) References Cited

U.S. PATENT DOCUMENTS 12,424,687 B2 * 9/2025 Yoon .................. H01M 50/105
2007/0231685 A1 * 10/2007 Takeuchi ............ H01M 50/178 429/163

(Continued)

FOREIGN PATENT DOCUMENTS

JP 2013239266 A 11/2013
JP 2017111853 A 6/2017

(Continued)

OTHER PUBLICATIONS

KR 20150095297 MT (Year: 2015).*

(Continued)

*Primary Examiner* — Alexander Usyatinsky
(74) *Attorney, Agent, or Firm* — Lerner David LLP

(57) ABSTRACT

Disclosed is a battery cell, which includes an electrode assembly including a cell body and an electrode tab provided to at least one side of the cell body, a cell case configured to accommodate the electrode assembly therein, an electrode lead coupled to the electrode tab and extending from the cell case, and a tab protection module accommodated in the cell case and configured to cover at least a portion of the electrode tab, the tab protection module including a lead positioning guide and a corresponding positioning guide insert portion adapted to receive the positioning guide insert portion, wherein the positioning guide insert portion is configured to couple to the electrode lead to guide a position of the electrode lead relative to the cell case.

19 Claims, 13 Drawing Sheets

(51) Int. Cl.

| | |
|---|---|
| ***H01M 50/14*** | (2021.01) |
| ***H01M 50/531*** | (2021.01) |
| *H01M 10/04* | (2006.01) |
| *H01M 10/42* | (2006.01) |
| *H01M 50/176* | (2021.01) |
| *H01M 50/50* | (2021.01) |
| *H01M 50/533* | (2021.01) |
| *H01M 50/534* | (2021.01) |
| *H01M 50/536* | (2021.01) |
| *H01M 50/55* | (2021.01) |
| *H01M 50/553* | (2021.01) |
| *H01M 50/557* | (2021.01) |
| *H01M 50/566* | (2021.01) |
| *H01M 50/588* | (2021.01) |

(52) U.S. Cl.

CPC .......... *H01M 50/531* (2021.01); *H01M 10/04* (2013.01); *H01M 10/42* (2013.01); *H01M 50/176* (2021.01); *H01M 50/50* (2021.01); *H01M 50/533* (2021.01); *H01M 50/534* (2021.01); *H01M 50/536* (2021.01); *H01M 50/55* (2021.01); *H01M 50/553* (2021.01); *H01M 50/557* (2021.01); *H01M 50/566* (2021.01); *H01M 50/588* (2021.01); *H01M 2220/20* (2013.01); *Y02E 60/10* (2013.01)

(56) References Cited

U.S. PATENT DOCUMENTS

| | | | | |
|---|---|---|---|---|
| 2009/0263712 | A1* | 10/2009 | Mizuta ................ | H01M 50/557 429/177 |
| 2013/0149600 | A1 | 6/2013 | Park et al. | |
| 2013/0164585 | A1* | 6/2013 | Kwak ................. | H01M 50/262 429/96 |
| 2020/0203700 | A1 | 6/2020 | Park et al. | |
| 2020/0321592 | A1 | 10/2020 | Motohashi et al. | |
| 2020/0343492 | A1 | 10/2020 | Kato | |
| 2022/0344754 | A1 | 10/2022 | Jo et al. | |

FOREIGN PATENT DOCUMENTS

| | | | |
|---|---|---|---|
| JP | 2022014715 | A | 1/2022 |
| JP | 2023097584 | A | 7/2023 |
| KR | 100960619 | B1 | 6/2010 |
| KR | 20130050616 | A | 5/2013 |
| KR | 20130063754 | A | 6/2013 |
| KR | 20130065290 | A | 6/2013 |
| KR | 101496547 | B1 | 2/2015 |
| KR | 20150095297 | * | 8/2015 |
| KR | 20150095297 | A | 8/2015 |
| KR | 20170086766 | A | 7/2017 |
| KR | 20180136176 | A | 12/2018 |
| KR | 20190001408 | A | 1/2019 |
| KR | 20200125495 | A | 11/2020 |
| KR | 20210044099 | A | 4/2021 |
| WO | 2007105541 | A1 | 9/2007 |
| WO | 2019139282 | A1 | 7/2019 |

OTHER PUBLICATIONS

Decision to Grant a Patent for JP2023513449 (Year: 2025).*
Extended European Search Report including Search Opinion from EP Appl. No. 22931113.9, dated Oct. 9, 2024, pp. 1-13.

* cited by examiner

FIG. 10
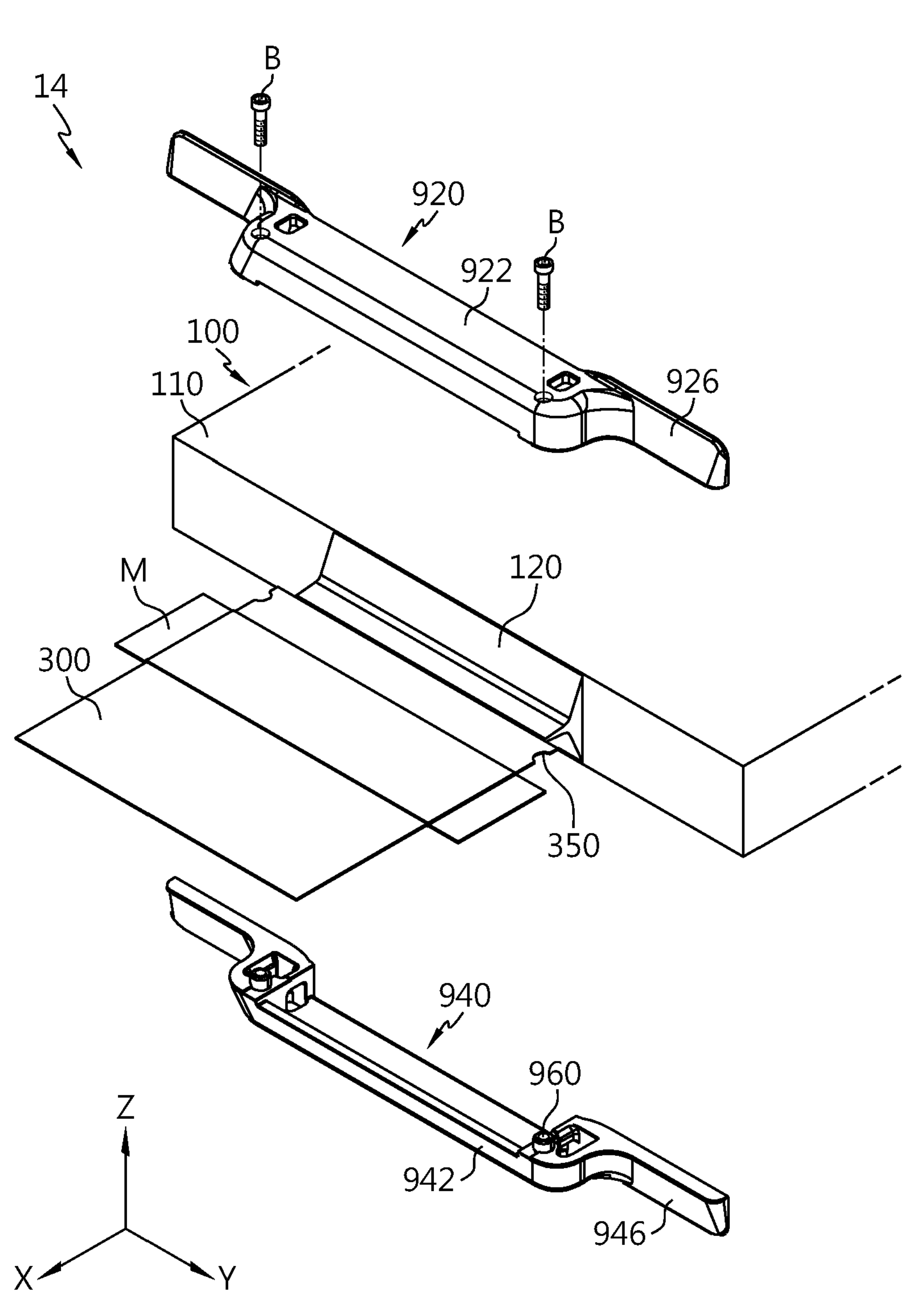

BATTERY CELL, AND BATTERY MODULE, BATTERY PACK AND VEHICLE INCLUDING THE SAME

TECHNICAL FIELD

The present disclosure relates to a battery cell, a battery module, a battery pack and a vehicle including the same. More particularly, the present disclosure relates to a battery cell having an electrode tab with an enhanced safety, a battery module, a battery pack and a vehicle including the same.

The present application claims priority to Korean Patent Application No. 10-2022-0031063 filed on Mar. 11, 2022, Korean Patent Application No. 10-2022-0072394 filed on Jun. 14, 2022, Korean Patent Application No. 10-2022-0124534 filed on Sep. 29, 2022 in the Republic of Korea, the disclosures of which are incorporated herein by reference.

BACKGROUND ART

Secondary batteries that are easily applicable to various product groups and have electrical characteristics such as high energy density are universally used not only in portable devices, but also electric vehicles (EVs) or hybrid electric vehicles (HEVs) driven by an electric drive source. These secondary batteries are attracting attention as a new energy source for improving eco-friendliness and energy efficiency due to not only the primary advantage of dramatically reducing the use of fossil fuels but also the secondary advantage of not generating by-products from the use of energy.

The types of secondary batteries currently widely used in the art include a lithium ion battery, a lithium polymer battery, a nickel cadmium battery, a nickel hydride battery, a nickel zinc battery, and the like. The operating voltage of such a unit secondary battery cell, namely a unit battery cell, is about 2.5V to 4.5V. Therefore, when a higher output voltage than this is required, a battery pack may be configured by connecting a plurality of battery cells in series. In addition, according to the charge/discharge capacity required for the battery pack, a plurality of battery cells are connected in parallel to configure a battery pack. Accordingly, the number of battery cells included in the battery pack may be arranged in various ways according to a required output voltage or charge/discharge capacity.

When a battery pack is configured by connecting a plurality of battery cells in series/parallel, in general, a battery module including at least one battery cell is configured first, and other components are added to at least one battery module to configure a battery pack.

In the conventional battery cell, generally, the periphery of an electrode tab for connecting the electrode assembly and the electrode lead is surrounded only by the cell case without a separate protective structure, so the corresponding portion is vulnerable to an external force transmitted through the cell case or the electrode lead.

In addition, since there is no separate mechanical structure for fixing the electrode lead connected to the electrode tab in the cell case, there is a problem in that the dimensional accuracy related to the fixing position of the electrode lead may not be as high as desired.

DISCLOSURE

Technical Problem

Accordingly, the present disclosure is directed to providing a battery cell capable of preventing an electrode tab from being broken or damaged when an impact occurs at the outside of the battery cell.

In addition, the present disclosure is also directed to providing a battery cell capable of improving dimensional accuracy related to positioning of an electrode lead.

However, the technical object to be solved by the present disclosure is not limited to the above, and other objects not mentioned herein will be clearly understood by those skilled in the art from the following disclosure.

Technical Solution

According to an aspect of the present disclosure, there is provided a battery cell, comprising: an electrode assembly including a cell body and an electrode tab provided to at least one side of the cell body; a cell case configured to accommodate the electrode assembly therein; an electrode lead coupled to the electrode tab and extending from the cell case; and a tab protection module accommodated in the cell case and configured to cover at least a portion of the electrode tab, the tab protection module including a lead positioning guide and a corresponding positioning guide insert portion adapted to receive the lead positioning guide, wherein the lead positioning guide is configured to couple to the electrode lead to guide a position of the electrode lead relative to the cell case.

In an embodiment, the lead positioning guide may be configured to fix the position of the electrode lead relative to the cell case.

In an embodiment, the lead positioning guide may include a pair of lead positioning guides, and the pair of lead positioning guides may be configured to guide positioning of opposing side edges of the electrode lead.

In an embodiment, the positioning guide insert portion may include a pair of positioning guide insert portions, each positioning guide insert portion of the pair of positioning guide insert portions being adapted to receive a corresponding lead positioning guide of the pair of lead positioning guides.

In an embodiment, the electrode lead may define a pair of guide insert portions, each guide insert portion of the pair of guide insert portions being formed along each of the opposing side edges of the electrode lead, each guide insert portion being sized and shaped to receive each of the pair of lead positioning guides.

In an embodiment, one end of the electrode tab coupled to the electrode lead may be disposed between the pair of guide insert portions.

In an embodiment, the positioning guide insert portion may be configured to surround at least a part of a side surface of the lead positioning guide.

In an embodiment, each guide insert portion of the pair of guide insert portions may define a shape corresponding to a shape of the positioning guide insert portion.

In an embodiment, the battery cell may further comprise a fixing member configured to fix the lead positioning guide and the positioning guide insert portion to each other.

In an embodiment, the tab protection module may be disposed between an inner surface of the cell case and the electrode assembly, a first end of the tab protection module may be positioned on at least one side of the electrode assembly, a second end of the tab protection module may be positioned at a coupling portion between the electrode tab and the electrode lead, and the electrode tab may be configured to be at least partially surrounded by the tab protection module between the first end of the tab protection module and the second end of the tab protection module.

In an embodiment, the coupling portion between the electrode tab and the electrode lead may be located in the tab protection module.

In an embodiment, the tab protection module may define a shape corresponding to an inner surface of the cell case.

In an embodiment, the cell case may include an accommodation portion configured to accommodate the electrode assembly therein; and a sealing portion extending outward from the accommodation portion by a predetermined length; the sealing portion may include a case terrace located in a direction along which the electrode lead extends, and the tab protection module may define a shape corresponding to an inner surface of the accommodation portion adjacent to the case terrace.

In an embodiment, the battery cell may further comprise a lead film interposed between the electrode lead and the case terrace, and the tab protection module may be disposed between the lead film and the electrode assembly.

In an embodiment, the tab protection module may be provided on at least one side of the cell body and configured to at least partially cover an upper side and a lower side of the electrode tab.

In an embodiment, the tab protection module may be positioned such that at least a portion of the tab protection module is in close contact with the cell body.

In another aspect of the present disclosure, there is also provided a battery module, comprising at least one battery cell according to an aspect of the present disclosure.

In another aspect of the present disclosure, there is also provided a battery pack, comprising at least one battery module according to an aspect of the present disclosure.

In another aspect of the present disclosure, there is also provided a vehicle, comprising at least one battery pack according to an aspect of the present disclosure.

In another aspect of the present disclosure, there is also provided a battery cell, comprising: an electrode assembly including a cell body and an electrode tab extending from at least one side of the cell body; a cell case configured to accommodate the electrode assembly therein; an electrode lead coupled to the electrode tab and extending from the cell case; and a tab protection module accommodated in the cell case and configured to cover at least a portion of the electrode tab, the tab protection module including a lead positioning guide configured to pass through the electrode lead from a first side of the electrode lead to a second opposing side of the electrode lead to guide a position of the electrode lead.

Advantageous Effects

According to an embodiment of the present disclosure, when an impact occurs outside the battery cell, it is possible to effectively prevent the electrode tab, which is structurally weak, from being separated or damaged.

In addition, when an impact occurs at the outside of the battery cell, it is possible to minimize the stress that may be generated at the electrode tab by dispersing the external force transferred to the electrode tab.

In addition, it is possible to improve the dimensional accuracy related to the fixed position of the electrode lead in the cell case.

Moreover, according to various embodiments of the present disclosure, several other additional effects may be achieved. Various effects of the present disclosure will be described in detail in each embodiment. Certain effects that can be easily understood by those skilled in the art will not be described in detail.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 2 is a cross-sectional view showing the battery cell of FIG. 1.

FIG. 4 is a partial exploded perspective view showing the battery cell of FIG. 2.

FIG. 9 is a diagram for illustrating a battery cell according to still another embodiment of the present disclosure.

FIG. 10 is an exploded perspective view showing the battery cell of FIG. 9.

FIG. 11 is an enlarged cross-sectional view showing a region C of FIG. 9.

FIG. 14 is a side view showing the inside of the battery cell of FIG. 13.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
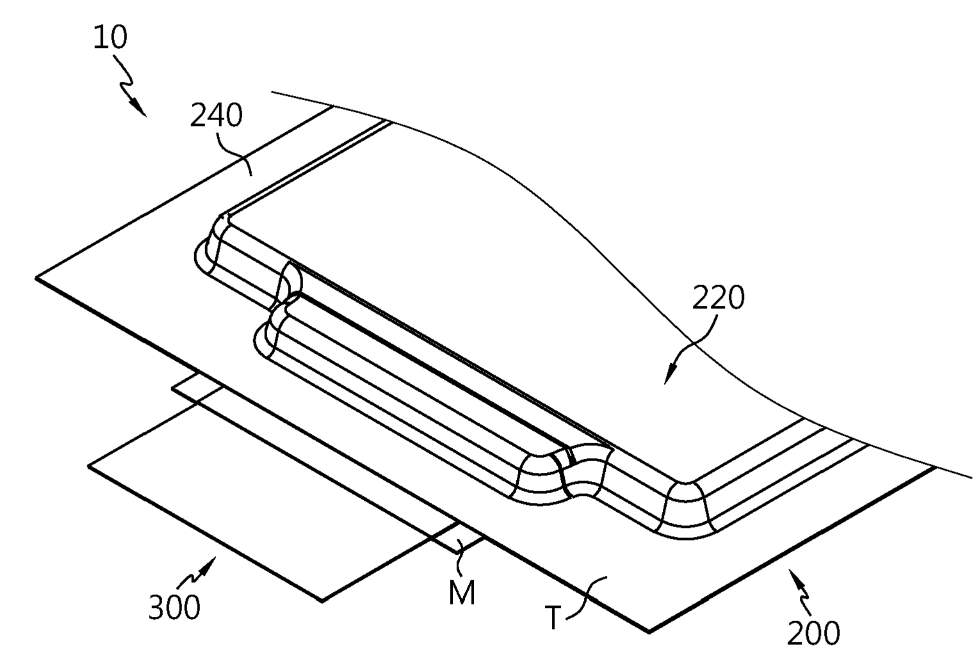
FIG. 1 is a diagram for illustrating a battery cell according to an embodiment of the present disclosure.
Figure 1:
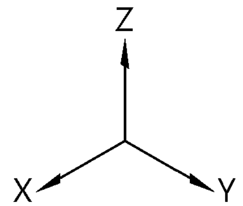
Figure 2:
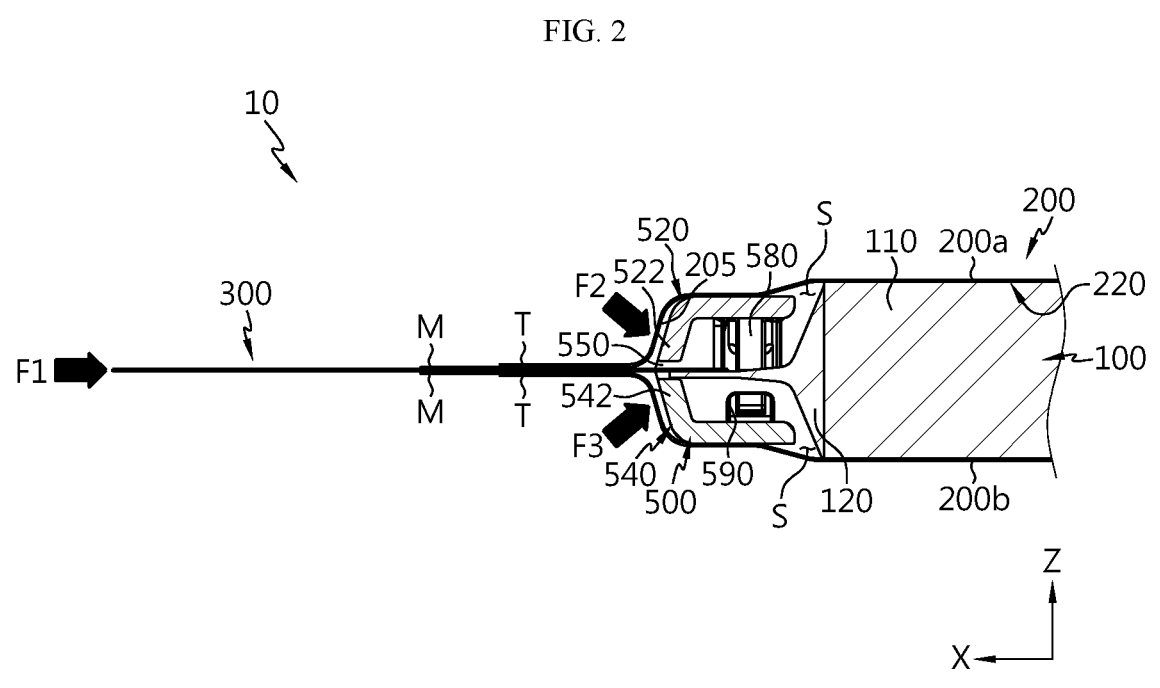
Figure 3:
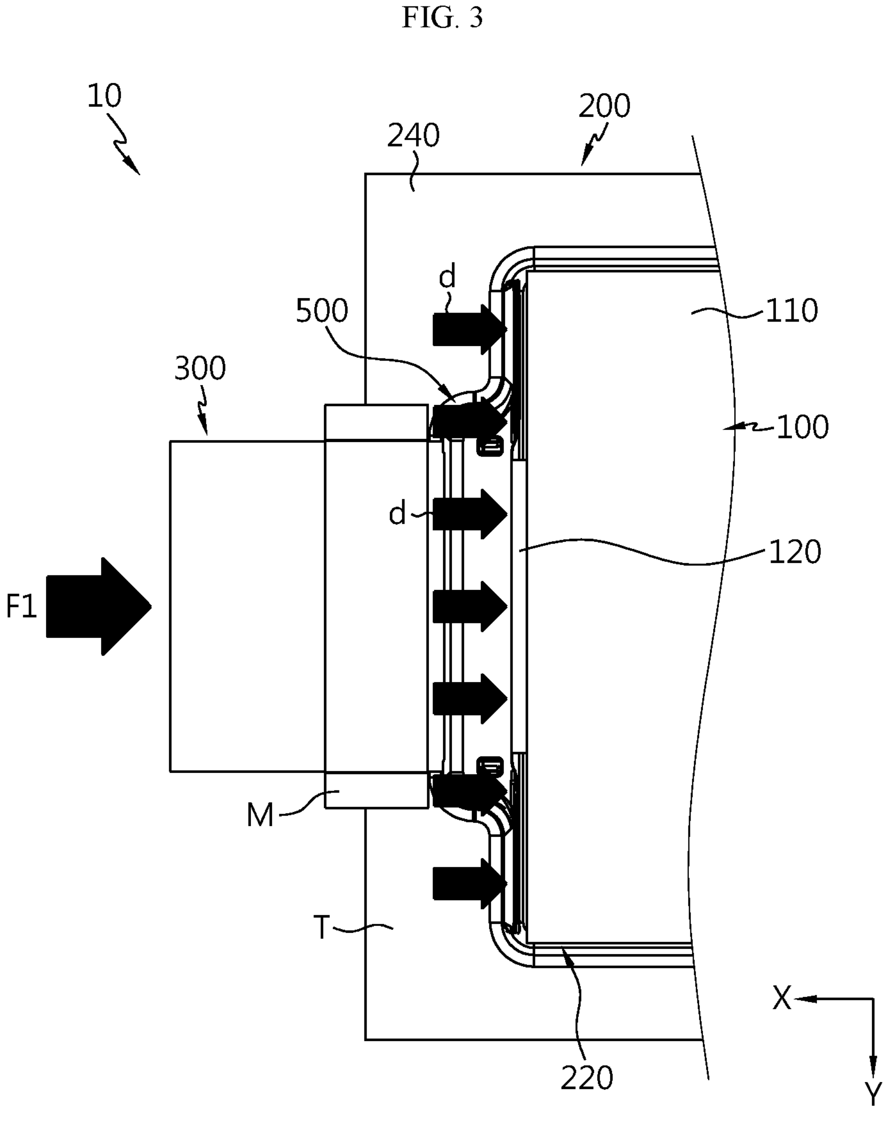
FIG. 3 is a diagram for illustrating the distribution of external force through a tab protection module when an impact occurs at the outside of the battery cell of FIG. 2.
Figure 4:
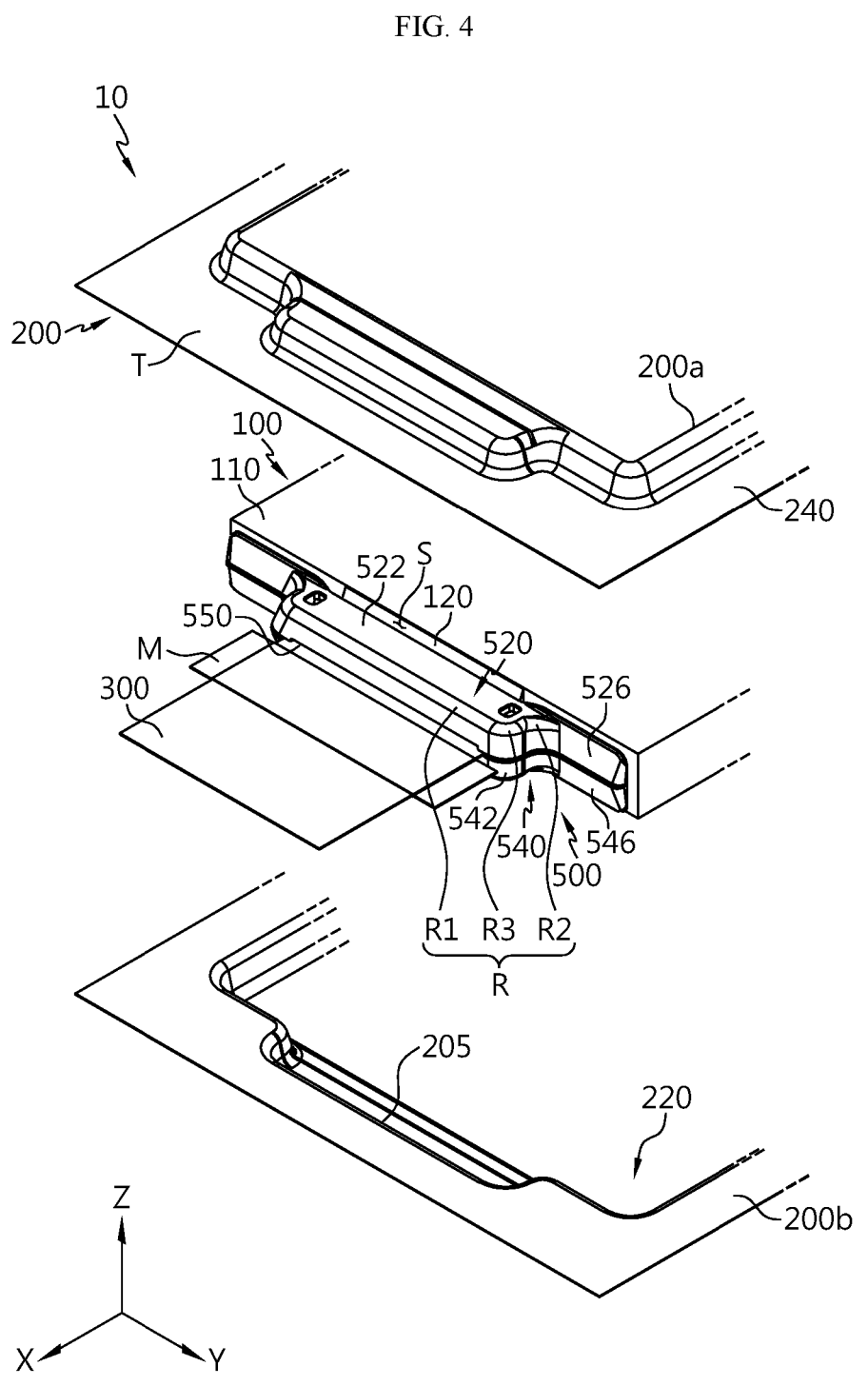

FIG. 1 is a diagram for illustrating a battery cell 10 according to an embodiment of the present disclosure; FIG. 2 is a cross-sectional view showing the battery cell 10 of FIG. 1; FIG. 3 is a diagram for illustrating the distribution of external force through a tab protection module 500 when an impact occurs at the outside of the battery cell 10 of FIG. 2; and FIG. 4 is a partial exploded perspective view showing the battery cell 10 of FIG. 2. Meanwhile, in order to more clearly show the external force dispersing effect of the tab protection module 500, a portion of the cell case 200 (an upper portion of the cell case 200 in FIGS. 1 and 2) is excluded in FIG. 3.

Referring to FIGS. 1 to 4, the battery cell 10 according to an embodiment of the present disclosure may include an electrode assembly 100, a cell case 200, an electrode lead 300, and a tab protection module 500.

The battery cell 10 may mean a secondary battery. The battery cell 10 may be a pouch-type battery cell.

The electrode assembly 100 may include a cell body 110 and an electrode tab 120.

Although not shown in detail, the electrode assembly 100 may include a first electrode plate having a first polarity, a second electrode plate having a second polarity, and a separator interposed between the first electrode plate and the second electrode plate. As an example, the first electrode plate may be a positive electrode plate coated with a positive electrode active material or a negative electrode plate coated with a negative electrode active material, and the second electrode plate may correspond to an electrode plate having a polarity opposite to that of the first electrode plate.

The electrode tab 120 may be at least a part of an uncoated portion where a positive electrode active material or a negative electrode active material is not applied. The uncoated portion may be a portion protruding from the first electrode plate or the second electrode plate of the electrode assembly 100. Specifically, the electrode tab 120 may be formed by gathering portions processed by a notching process among the uncoated portion. The cell body 110 may be defined as a portion other than the electrode tab 120 in the electrode assembly 100.

Meanwhile, in the present disclosure, the electrode tab 120 is not limited to at least a part of the uncoated portion. That is, the electrode tab 120 may be separately provided and coupled to the uncoated portion.

The cell body 110 may be defined as a portion of the electrode assembly 100 other than the electrode tab 120. The electrode tab 120 may be provided on at least one of both sides of the cell body 110.

The cell case 200 may accommodate the electrode assembly 100 therein. That is, the cell case 200 may have an accommodation space for accommodating the electrode assembly 100 therein. At this time, the cell case 200 accommodates an electrolyte therein, and the cell case 200 accommodates the electrode assembly 100 in a state where the electrode assembly 100 is loaded with the electrolyte. As an example, the cell case 200 may include a pouch film including a layer of a metal material (e.g., aluminum (Al)), but is not limited thereto.

The electrode lead 300 may be drawn out of the cell case 200 by a predetermined length. The electrode lead 300 may be provided in a pair, and the pair of electrode leads 300 may be provided on either side of the cell case 200, respectively, or may be provided on only one side. In addition, a lead film M for sealing the cell case 200 and the electrode lead 300 to each other may be interposed between the cell case 200 and the electrode lead 300. As an example, the lead film M may be provided as a heat-fusing film to increase the sealing force of the area of the cell case 200 where the electrode lead 300 is disposed. In addition, the lead film M may be configured to include an insulating material to prevent a short circuit of the electrode lead 300.

In addition, the electrode lead 300 may be connected to the electrode assembly 100 inside the cell case 200 through the electrode tab 120. As an example, the electrode lead 300 may be coupled to the electrode tab 120 by welding or the like.

The tab protection module 500 may be accommodated in the cell case 200 and configured to cover at least a part of the electrode tab 120. As an example, the tab protection module 500 may be configured to include an insulating material. Accordingly, it is possible to minimize the occurrence of a short circuit in the cell body 110, the electrode tab 120 and the electrode lead 300 as the tab protection module 500 comes into contact with the cell body 110, the electrode tab 120, the electrode lead 300, and the like.

The electrode tab 120 described above may have a relatively small thickness compared to the cell body 110. Therefore, the electrode tab 120 may be vulnerable to an impact caused by an external force transmitted to the cell case 200 from the outside.

By covering the electrode tab 120, the tab protection module 500 may receive an impact caused by an external force F1, F2, F3 or the like transmitted to the cell case 200 from the outside more preferentially than the electrode tab 120. It should also be noted that the electrode tab 120 may further be at risk of receiving an internal force caused by the expansion and contraction of the electrode assembly 100 caused by the charging and discharging of the electrode battery cell 10. An additional benefit of the tab protection module 500 is to absorb such internal forces from the electrode assembly 100 and maintain the integrity of the electrode lead 300.

Specifically, the tab protection module 500 may absorb an impact caused by an external force F1, F2, F3 transmitted to the cell case 200 from the outside. In addition, the tab protection module 500 may be configured to disperse the impact absorbed in this way to a plurality of regions of the electrode assembly 100. Accordingly, the impact applied to the electrode tab 120 may be reduced or minimized.

In addition, the tab protection module 500 may be configured to cover at least a part of the electrode tab 120 so that a predetermined space is formed between the electrode tab 120 and the inner surface 205 of the cell case 200. Accordingly, it is possible to minimize an impact caused by an external force transmitted to the cell case 200 from the outside from being transmitted to the electrode tab 120.

More specifically, the tab protection module 500 may be configured to receive the external forces F1, F2, F3 more preferentially than the electrode tab 120 and disperse the external forces F1, F2, F3 delivered to the electrode tab 120 into a plurality of regions of the electrode assembly 100 as shown in FIG. 3 (see 'd' in FIG. 3).

In addition, the tab protection module 500 may be configured to guide the positioning of the electrode lead 300 inside the cell case 200. In particular, the tab protection module 500 may be configured to fix the electrode lead 300 inside the cell case 200 in order to prevent an impact from being applied to the coupling portion where the electrode lead 300 is coupled to the electrode tab 120 as the electrode lead 300 moves inside the cell case 200.

To this end, the tab protection module 500 may include a configuration for fixing the electrode lead 300 inside the cell case 200. The configuration of the tab protection module 500 will be described later in more detail.

According to this embodiment of the present disclosure, when an impact occurs at the outside of the battery cell 10, it is possible to effectively prevent the structurally weak electrode tab 120 from being separated or damaged.

In addition, when an impact occurs at the outside of the battery cell 10, the external force transferred to the electrode tab 120 is dispersed, thereby minimizing stress that may be generated at the electrode tab 120.

In addition, it is possible to improve the dimensional accuracy related to the fixing position of the electrode lead 300 inside the cell case 200. That is, in examples that lack a tab protection module 500, the cell case 200 may lack appropriate structure for fixing the position of the electrode lead 300 within the cell case 200 while the cell case 200 is being assembly and the pouch sealed. Thus, the presence of the tab protection module 500 may provide additional structure to the cell case 200 to then position the electrode lead 300 as desired and maintain such positioning of the electrode lead 300 as the electrode assembly 100 is assembled in production.

In addition, an event such as a thermal runaway phenomenon may occur in battery cell 10 as in the present disclosure. In this case, a high-temperature and high-pressure venting gas may be generated inside the cell case 200. Meanwhile, in the present disclosure, since the tab protection module 500 described above is accommodated inside the cell case 200 while forming a predetermined inner space, the volume inside the cell case 200 may be further increased, and thus it is possible to prevent the internal pressure from rapidly increasing due to the venting gas generated inside the cell case 200. In other words, because the cell case 200 is a pouch that is generally formed of a flexible material, the presence of the tab protection module 500 fills up a greater amount of space inside the pouch and expands the pouch further outward relative to an assembly lacking a tab protection module 500. With the perimeter of the cell case 200 expanded further outward, the volume inside the cell case 200 is increased, and a greater interior volume reduces the speed at which the internal pressure of the cell case 200 can increase due to the gaseous build-up. Accordingly, it is possible to effectively delay the time when a certain region of the cell case 200 is damaged and the venting gas is discharged to the outside of the cell case 200.

Meanwhile, the tab protection module 500 may include at least one heat dissipation hole (not shown). The heat dissipation hole may be formed to penetrate from the inner surface of the tab protection module 500 (the surface of the tab protection module 500 facing the electrode tab 120) to the outer surface of the tab protection module 500 (the surface of the tab protection module 500 facing the inner surface of the cell case 200). Through this heat dissipation hole, the tab protection module 500 may transfer the heat generated inside the battery cell 10 to the cell case 200 so that the heat is induced to be discharged to the outside of the battery cell 10.

Hereinafter, the battery cell 10 of the present disclosure will be described in more detail.

Referring to FIGS. 1 to 4 again, the tab protection module 500 may be disposed between the inner surface 205 of the cell case 200 and the electrode assembly 100. The tab protection module 500 may cover the electrode tab 120 at the disposed position.

Through the arrangement of the tab protection module 500, as shown in FIG. 3, the external force F1 transferred to the electrode lead 300 exposed to the outside of the cell case 200 may be more effectively dispersed.

In addition, the tab protection module 500 may be disposed between the cell case 200 and a partial region of the electrode tab 120. Specifically, the tab protection module 500 may be disposed between the cell case 200 and a partial region of the electrode tab 120 in an upper region (+Z-axis direction) and a lower region (−Z-axis direction) of the electrode tab 120.

Through the arrangement of the tab protection module 500, the external forces F2, F3 generated at the upper and lower sides (Z-axis direction) of the outer surface of the cell case 200 may also be more effectively dispersed.

As such, the tab protection module 500 may significantly reduce the impact that can be applied to the electrode tab 120 at the electrode lead 300 and both the upper and lower sides (Z-axis direction) of the outer surface of the cell case 200 that may transmit an external force toward the electrode tab 120.

Referring to FIGS. 2 to 4, when the tab protection module 500 covers the electrode tab 120, one end of the tab protection module 500 may be positioned on at least one side of the electrode assembly 100. In addition, the other end of the tab protection module 500 may be positioned on or near the coupling portion where the electrode tab 120 is coupled to the electrode lead 300.

Accordingly, the electrode tab 120 may be at least partially covered by the tab protection module 500 between one end of the tab protection module 500 and the other end of the tab protection module 500.

According to this embodiment, the electrode tab 120 is provided in a predetermined inner space of the tab protection module 500 in the horizontal direction (X-axis direction) of the electrode lead 300 and thus may be more reliably protected from external impact or the like. That is, the tab protection module 500 may be sized and shaped to have a length in the X-axis direction to contain a portion of the electrode tab 120 to thus provide reliable support to the corresponding portion of the electrode lead 300, e.g., the coupling portion where the electrode lead 300 is coupled to the electrode tab 120.

Referring to FIGS. 2 to 4, the coupling portion where the electrode tab 120 is coupled to the electrode lead 300 may be configured to be located in the inner space of the tab protection module 500.

Specifically, the entire area of the coupling portion between the electrode tab 120 and the electrode lead 300 may be configured to be located in the inner space of the tab protection module 500.

Accordingly, the damage to the electrode tab 120 may be minimized, and the connection between the electrode tab 120 and the electrode lead 300 may be stably maintained.

Referring to FIGS. 1 to 4 again, the tab protection module 500 may be configured to have a shape corresponding to the inner surface 205 of the cell case 200 facing the tab protection module 500. Specifically, the tab protection module 500 may be provided in a shape corresponding to the inner surface 205 at the upper and lower sides (Z-axis direction) of the cell case 200.

According to this embodiment, the tab protection module 500 may more effectively buffer the impact caused by an external force transmitted to the cell case 200 from the outside. Accordingly, the impact applied to the electrode tab 120 may be minimized. In addition, through this shape structure, the tab protection module 500 may be accommodated inside the cell case 200 without causing a shape deformation of the cell case 200. In addition, through this shape structure, the tab protection module 500 may minimize the presence of dead space inside the cell case 200 when being disposed inside the cell case 200.

Specifically, the cell case 200 may include an accommodation portion 220 and a sealing portion 240.

The accommodation portion 220 may be configured to accommodate the electrode assembly 100 therein.

The sealing portion 240 may have a shape extending outward by a predetermined length from the periphery of the accommodation portion 220.

Meanwhile, the cell case 200 may include a first case member 200*a* and a second case member 200*b*. Peripheral regions of the edges of the first case member 200*a* and the second case member 200*b* may come into contact with each other and be coupled by thermal fusion to form the sealing portion 240 described above. In addition, a space is formed inside the sealing portion 240 by the separation between the first case member 200*a* and the second case member 200*b*, and this space may serve as the accommodation portion 220 described above. That is, each of the first case member 200*a* and the second case member 200*b* may have an indentation or convexity relative to the peripheral regions of the edges of the case members 200*a*, 200*b*, wherein the indentations or convexities of the first and second case members 200*a*, 200*b* are in opposite directions, thus forming the accommodation portion 220 therebetween properly sized to fit the cell case 200.

In addition, the sealing portion 240 may include a case terrace T. The case terrace T may refer to a region located in a direction along which the electrode lead 300 is drawn out of the cell case 200, among the entire region of the sealing portion 240.

That is, the case terrace T may be configured to extend by a predetermined length from the accommodation portion 220 and to support the electrode lead 300. It is possible to seal the electrode lead 300 and the cell case 200 to each other through the lead film M described above. Specifically, the lead film M may be interposed between the electrode lead 300 and the case terrace T.

The tab protection module 500 described above may have a shape corresponding to the inner surface 205 of the accommodation portion 220 adjacent to the case terrace T. In this case, regions of the accommodation portion 220 and the case terrace T adjacent to each other may be structurally weak due to the shape of the bent structure or the like.

In the embodiment of the present disclosure, since the tab protection module 500 may be accommodated in the accommodation portion 220 while having a shape corresponding to the inner surface 205 of the accommodation portion 220 adjacent to the case terrace T, the rigidity of the adjacent regions of the accommodation portion 220 and the case terrace T may be reinforced. Accordingly, the tab protection module 500 may enhance the structural rigidity of the cell case 200 further by reinforcing the rigidity of the structurally weak region in the cell case 200. That is, the accommodation portion 220 of the cell case 200 may shaped specifically to fit the tab protection module 500 so that when the battery cell 10 is fully assembled, there is little to no space between the accommodation portion 220 and the tab protection module 500. The combination of components forms a tight stack of layers which prevents the tab protection module 500, and thus the electrode tab 120, from bouncing around upon receipt of an external impact.

Referring to FIGS. 1 to 4 again, the battery cell 10 may further include a lead film M interposed between the electrode lead 300 and the case terrace T as described above.

At this time, the tab protection module 500 may be disposed between the lead film M and the electrode assembly 100. According to this arrangement, when an impact occurs at the electrode lead 300 outside the cell case 200 due to the external force F1 or the like, the lead film M may receive the external force F1 more preferentially than the tab protection module 500 to buffer the impact.

Since the tab protection module 500 is configured to secondarily disperse the impact absorbed in the lead film M to a plurality of regions of the electrode assembly 100 later, it is possible to further minimize the external force transferred to the electrode tab 120.

Figure 5:
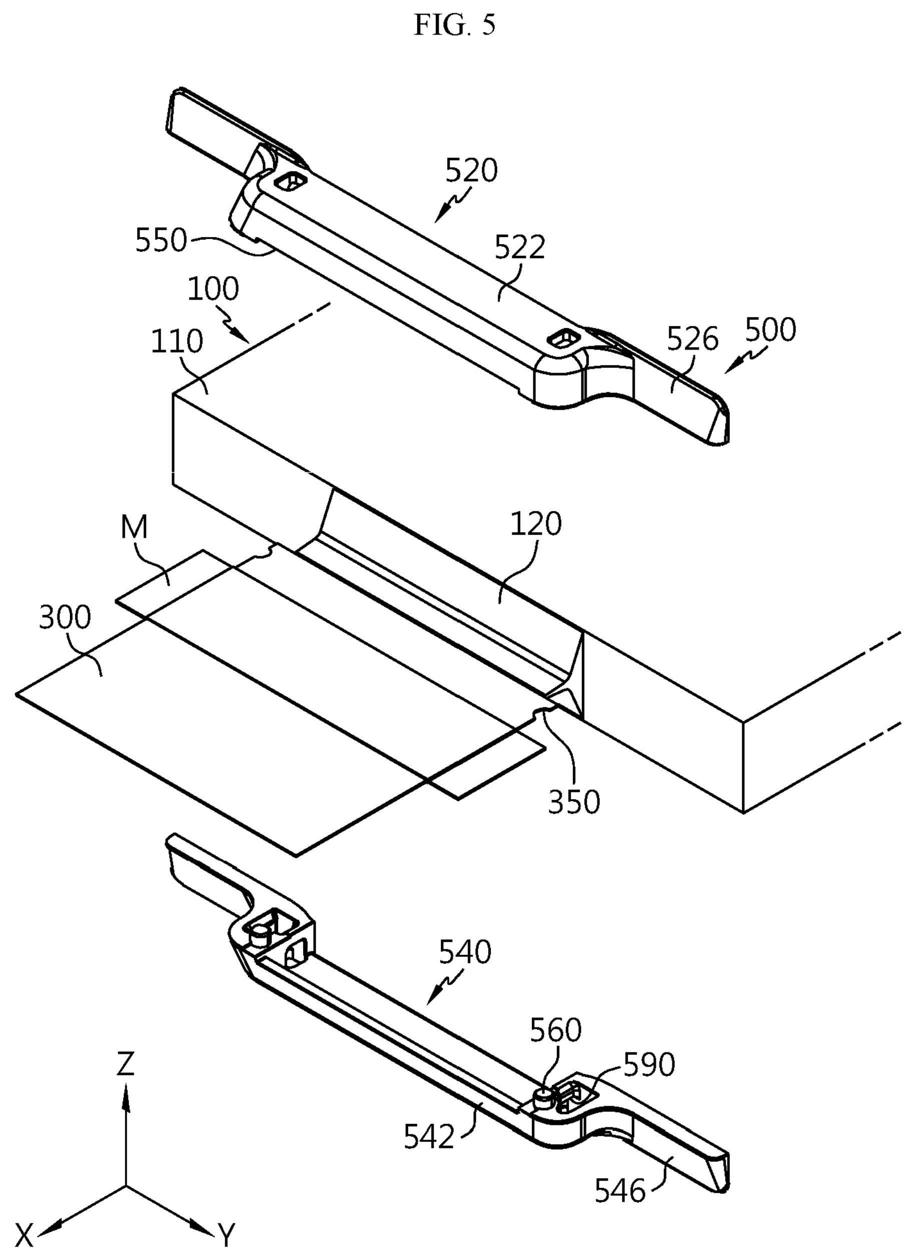
FIG. 5 is an exploded perspective view showing the battery cell of FIG. 4 from which a cell case is excluded.
Figure 6:
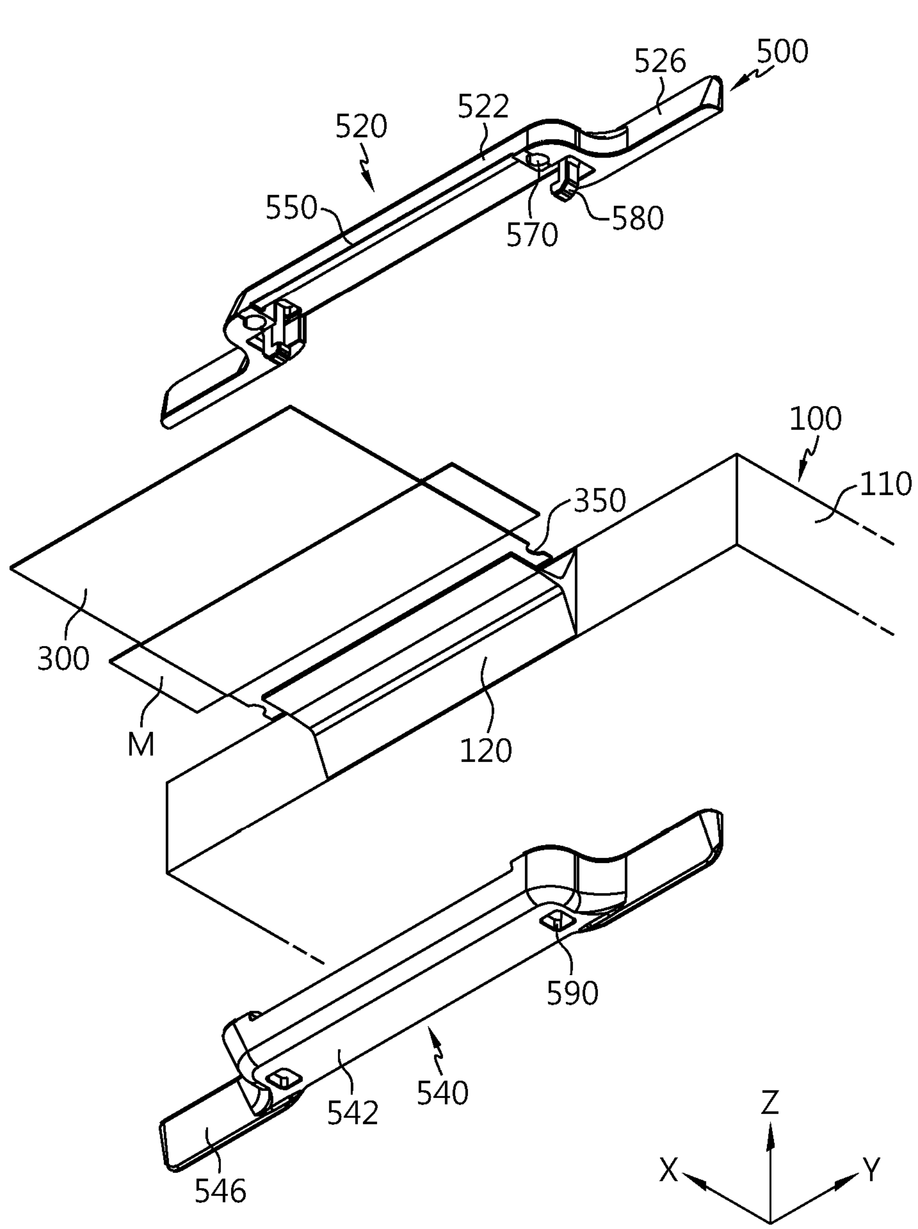
FIG. 6 is an exploded perspective view showing the bottom side of the battery cell of FIG. 5.

FIG. 5 is an exploded perspective view showing the battery cell 10 of FIG. 4 from which the cell case 200 is excluded, and FIG. 6 is an exploded perspective view showing the bottom side of the battery cell 10 of FIG. 5.

Referring to FIGS. 2 to 6, the tab protection module 500 may be provided on at least one side of the cell body 110 described above. The tab protection module 500 as described above may at least partially cover upper and lower sides of the electrode tab 120. The tab protection module 500 may be provided on one side of the cell body 110 to cover most of the upper and lower sides of the electrode tab 120.

Accordingly, since the tab protection module 500 may more reliably cover the electrode tab 120, it is possible to more effectively prevent the electrode tab 120 from being damaged due to an external impact or the like.

Specifically, the tab protection module 500 may include a first protection cap 520 and a second protection cap 540.

The first protection cap 520 may be provided on at least one side of the cell body 110. In addition, the first protection cap 520 may at least partially cover the upper side (+Z-axis direction) of the electrode tab 120 and protect the upper side (+Z-axis direction) of the electrode tab 120.

The first protection cap 520 may include a first cap body 522 and a first cap wing 526.

The first cap body 522 may at least partially cover the upper side (+Z-axis direction) of the electrode tab 120. In addition, the first cap body 522 may be configured to have a shape corresponding to the inner surface 205 of the cell case 200 facing the first cap body 522. Accordingly, the first cap body 522 may reinforce the structural rigidity of the facing cell case 200.

The first cap wing 526 may be configured to extend from both ends of the first cap body 522. The first cap wing 526 may be configured to cover a side of the cell body 110 at a portion S of the side of the cell body 110 at which the electrode tab 120 is not positioned. In other words, the electrode tab 120 may extend from a side of the cell body 110, and the first cap wing 526 may be positioned on that same side of the cell body 110 as the electrode tab 120, but may cover a portion of that side of the cell body 110 adjacent to the electrode tab 120, e.g., where the electrode tab 120 is not located.

In addition, the first cap wing 526 may guide the external forces F1, F2, F3 to be dispersed to the entire first protection cap 520 together with the first cap body 522. In addition, the first cap wing 526 may surround the electrode tab 120 together with the first cap body 522 by covering one side of the cell body 110 at both sides of the first cap body 522. That is, the first cap wing 526 may extend on opposing sides of the first protection cap 520, and together with the first cap body 522, may surround the electrode tab 120.

Accordingly, when viewed from the upper side (+Z-axis direction) of the electrode lead 300, the electrode tab 120 may be covered by the first protection cap 520 at all of the front side (+X-axis direction) and both left and right sides (Y-axis direction) of the electrode assembly 100.

The second protection cap 540 may be provided on at least one side of the cell body 110. In addition, the second protection cap 540 may be connected to the first protection cap 520 in the upper and lower direction. In addition, the second protection cap 540 may at least partially cover the lower side (−Z-axis direction) of the electrode tab 120 and protect the lower side (−Z-axis direction) of the electrode tab 120.

The second protection cap 540 may include a second cap body 542 and a second cap wing 546.

The second cap body 542 may at least partially cover the lower side (−Z-axis direction) of the electrode tab 120. In addition, the second cap body 542 may be configured to have a shape corresponding to the inner surface 205 of the cell case 200 facing the second cap body 542. Accordingly, the second cap body 542 may reinforce the structural rigidity of the facing cell case 200.

The second cap wing 546 may be configured to extend from both ends of the second cap body 542. The second cap wing 546 may be configured to cover a side of the cell body 110 at a portion S of the side of the cell body 110 at which the electrode tab 120 is not positioned.

In addition, the second cap wing 546 may guide the external forces F1, F2, F3 to be dispersed to the entire second protection cap 540 together with the second cap body 542. In addition, the second cap wing 546 may surround the electrode tab 120 together with the second cap body 542 by covering one side of the cell body 110 at both sides of the second cap body 542. That is, the second cap wing 546 may extend on opposing sides of the second protection cap 540, and together with the second cap body 542, may surround the electrode tab 120.

Accordingly, when viewed from the lower side (−Z-axis direction), the electrode lead 300 may be covered by the second protection cap 540 at all of the front side (+X-axis direction) and both left and right sides (Y-axis direction) of the electrode assembly 100.

The first protection cap 520 and the second protection cap 540 may be assembled with each other in the upper and lower direction of the electrode tab 120 to at least partially surround the electrode tab 120.

Accordingly, it is possible to minimize that an impact caused by an external force transmitted through the cell case 200 from the outside is transmitted to the electrode tab 120. In addition, since an impact caused by an external force transmitted to the cell case 200 from the outside may be dispersed even in an area of the cell body 110 where the electrode tab 120 is not provided, the impact applied to the electrode tab 120 may be further minimized.

Meanwhile, referring to FIGS. 4 to 6, the tab protection module 500 is shown to be formed approximately symmetrically with respect to the center in the left and right direction (Y-axis direction) of the battery cell 10, and it is shown to be formed approximately vertically symmetrically with respect to the center in the upper and lower direction (Z-axis direction) of the battery cell 10. However, this is an example, and the tab protection module 500 may be formed asymmetrically in the left and right direction and/or in the upper and lower direction as a whole. Also, referring to FIGS. 4 to 6, the first cap wing 526 and the second cap wing 546 of the tab protection module 500 are shown to extend from both ends of the first cap body 522 and the second cap body 542 along the left and right direction (Y-axis direction) of the battery cell 10, respectively. However, this is only an example, and the first cap wing 526 and the second cap wing 546 may also be formed to extend along the upper and lower direction (Z-axis direction) from the first cap body 522 and the second cap body 542, respectively.

Referring to FIGS. 3 to 6 again, the tab protection module 500 may be configured such that at least a part thereof is in close contact with the cell body 110.

Specifically, the first cap wing 526 of the first protection cap 520 and the second cap wing 546 of the second protection cap 540 may be configured to be in close contact with one side of the cell body 110 at a portion S of the cell body 110 at which the electrode tab 120 is not positioned. In other words, the electrode tab 120 may extend from a side of the cell body 110, and the second cap wing 546 may be positioned on that same side of the cell body 110 as the electrode tab 120, but may cover a portion of that side of the cell body 110 adjacent to the electrode tab 120, e.g., where the electrode tab 120 is not located.

Accordingly, an impact caused by an external force transmitted from the outside to the cell case 200 may be more reliably dispersed to the entire cell body 110, and thus the impact applied to the electrode tab 120 may be further minimized.

Referring to FIGS. 2 to 6 again, the tab protection module 500 may further include a lead slot 550 through which the electrode lead 300 passes. The lead slot 550 may be formed at a front side of the tab protection module 500.

Specifically, when the first protection cap 520 and the second protection cap 540 are coupled to each other, if viewed from the front of the tab protection module 500, an opening space of a predetermined size may be formed between the first protection cap 520 and the second protection cap 540 in the upper and lower direction. The lead slot 550 may correspond to the opening space of a predetermined size formed when the first protection cap 520 and the second protection cap 540 are assembled in this way. In other words, the lead slot 550 may be a space defined between the first protection cap 520 and the second protection cap 540, the space sized and shaped to receive the electrode lead 300. Thus, after the electrode assembly 100 is assembled with the tab protection module 500 and the electrode lead 300, the first protection cap 520 may be disposed on a first (e.g., upper) side of the electrode lead 300 and the second protection cap 540 may be disposed on a second (e.g., lower) side of the electrode lead.

According to this embodiment, it is possible to prevent the electrode lead 300 from being damaged and to minimize the occurrence of a short circuit in the electrode lead 300.

Referring to FIGS. 5 and 6, the tab protection module 500 may include a lead positioning guide 560.

The lead positioning guide 560 may be provided on any one of the first protection cap 520 and the second protection cap 540. The lead positioning guide 560 is provided in one or in plural, and may be positioned adjacent an edge of the electrode lead 300 to guide or maintain the fixation of the electrode lead 300 inside the cell case 200.

Specifically, the lead positioning guide 560 may be provided in a protrusion shape protruding by a predetermined height. As an example, the lead positioning guide 560 may be provided on the upper side of the second protection cap 540. In particular, the lead positioning guide 560 may protrude by a predetermined height from the upper surface of the second cap body 542, and may fix the edge of the electrode lead 300 to the tab protection module 500.

According to the lead positioning guide 560, the position of the electrode lead 300 inside the cell case 200 may be fixed with respect to the cell case 200. Accordingly, even when an external force is applied to the electrode lead 300, the movement of the electrode lead 300 inside the cell case 200 may be minimized. Accordingly, it is possible to prevent the connection portion between the electrode lead 300 and the electrode tab 120 from being damaged due to a force applied thereto.

In addition, according to the lead positioning guide 560, since the position of the electrode lead 300 inside the cell case 200 is fixed, it is possible to effectively prevent the position of the electrode tab 120 connected to the electrode lead 300 from being dislocated even if an impact occurs at the electrode lead 300 due to an external force or the like.

In one embodiment, the lead positioning guide 560 may be provided in a pair.

The pair of lead positioning guides 560 may be configured to guide or maintain the fixation of both side edges of the electrode lead 300. Accordingly, the pair of lead positioning guides 560 may more stably fix the position of the electrode lead 300 inside the cell case 200 with respect to the cell case 200.

As an example, the pair of lead positioning guides 560 may be provided on the upper side of the second protection cap 540. In particular, the pair of lead positioning guides 560 may protrude by a predetermined height from the upper surface of the second cap body 542, and fix both side edges of the electrode lead 300 to the tab protection module 500. In addition, the pair of lead positioning guides 560 may be disposed to face each other with the aforementioned lead slot 550 interposed therebetween.

Referring to FIGS. 5 and 6 again, the tab protection module 500 may further include a positioning guide insert portion 570.

The positioning guide insert portion 570 may be coupled to the lead positioning guide 560 in the upper and lower direction to guide or maintain the fixation of the electrode lead 300 inside the cell case 200. The shape of the positioning guide insert portion 570 may be variously configured. As an example, the positioning guide insert portion 570 may be formed in a groove shape or may define a hole, recess, indentation, or the like.

In addition, the positioning guide insert portion 570 may be provided on any one of the first protection cap 520 and the second protection cap 540. The positioning guide insert portion 570 is provided in one or in plural, and may be configured to guide or maintain the fixation of the electrode lead 300 inside the cell case 200 together with the lead positioning guide 560.

The positioning guide insert portion 570 may be provided to correspond to the number of lead positioning guides 560. As an example, the positioning guide insert portion 570 may be provided in a pair to correspond to the pair of lead positioning guides 560. In further examples, the tab protection module 500 may include three or more lead positioning guides 560, all of which may be on the first protection cap 520, or the second protection cap 540, or some on one and some on the other, and the tab protection module 500 may further include three or more positioning guide insert portions 570, each positioning guide insert portion 570 may be positioned opposite a lead positioning guide 560 to correspond to and mate with each lead positioning guide 560.

In one embodiment, the pair of positioning guide insert portions 570 may be provided on the lower side of the first protection cap 520. In particular, the pair of positioning guide insert portions 570 may be formed by a predetermined depth at the lower surface of the first cap body 522. In addition, the pair of lead positioning guides 560 may be disposed to face each other with the aforementioned lead slot 550 interposed therebetween.

The lead positioning guide 560 may be at least partially inserted into one of the pair of positioning guide insert portions 570.

In addition, when viewed in the upper and lower direction, both side edges of the electrode lead 300 may be disposed between the first cap body 522 and the second cap body 542. That is, as the lead positioning guide 560 and the positioning guide insert portion 570 provided on the tab protection module 500 are coupled, both side edges of the electrode lead 300 may be disposed between the first cap body 522 and the second cap body 542. In this state, the positions of both side edges of the electrode lead 300 may be fixed in the upper and lower direction (Z-axis direction), the front and rear direction (X-axis direction) and the left and right direction (Y-axis direction) of the battery cell 10.

According to this embodiment, the position of the electrode lead 300 inside the cell case 200 may be more stably fixed.

Referring to FIGS. 5 and 6 again, a guide insert portion 350 may be formed at both side edges of the electrode lead 300 so as to receive or be inserted into each lead positioning guide 560. In addition, at least a part of the guide insert portion 350 may be formed in a shape corresponding to that of the lead positioning guide 560. The shape of the guide insert portion 350 may be variously configured. As an example, the guide insert portion 350 may be formed in a groove shape or may define a hole, indentation, recess, or the like.

In a state where the guide insert portion 350 receives or is inserted into the lead positioning guide 560 as above, the position of the electrode lead 300 inside the cell case 200 may be fixed through the coupling of the lead positioning guide 560 and the positioning guide insert portion 570. That is, since the electrode lead 300 is inserted into the lead positioning guide 560 with the guide insert portion 350 having a shape corresponding to the lead positioning guide 560, the position of the electrode lead 300 inside the cell case 200 may be more easily fixed.

In addition, since the guide insert portion 350 of the electrode lead 300 is adapted to receive or be inserted into and fixed to the lead positioning guide 560, it is possible to effectively prevent the position of the electrode lead 300 from being dislocated even when an impact caused by an external force or the like occurs at the electrode lead 300. In other words, the guide insert portion 350 is recess or indentation defined by the electrode lead 300 that may be sized and shaped to snugly receive the lead positioning guide 560, so that when the lead positioning guide 560 and the guide insert portion 350 are coupled to one another, the edge of the electrode lead 300 generally wraps at least partially around the lead positioning guide 560 to from a snug-fitting connection between the lead positioning guide 560 and the guide insert portion 350, thereby reducing or preventing movement of the electrode lead 300 relative to the tab protection module 500.

Referring to FIGS. 5 and 6 again, one end of the electrode tab 120 connected to the electrode lead 300 may be disposed between the guide insert portions 350.

That is, one end of the electrode tab 120 may be disposed between the pair of lead positioning guides 560 into which the guide insert portion 350 is inserted. According to this embodiment, when the lead positioning guide 560 and the positioning guide insert portion 570 are coupled, inside the cell case 200, the electrode tab 120 connected to the electrode lead 300 may be more stably aligned.

Hereinafter, an exemplary coupling structure of the above tab protection module 500 will be described in detail.

Referring to FIGS. 5 and 6, the first protection cap 520 and the second protection cap 540 may be coupled to each other through hook-coupling. Through the hook-coupling, the first protection cap 520 and the second protection cap 540 may be coupled in an easier and simpler way.

Specifically, any one of the first protection cap 520 and the second protection cap 540 may have a fastening hook 580 for the hook-coupling. In addition, the other of the first protection cap 520 and the second protection cap 540 may have a hook groove 590 into which the fastening hook 580 is fitted.

As an example, the fastening hook 580 may be provided in a pair at the bottom of the first protection cap 520. The pair of fastening hooks 580 may be provided to protrude by a predetermined length from both sides of the bottom of the first cap body 522.

In addition, the hook groove 590 is formed in a pair to correspond to the fastening hook 580, and the pair of hook grooves 590 may be provided on the second protection cap 540. The pair of hook grooves 590 may be formed in the form of a groove capable of fixing the end of the fastening hook 580 at both sides of the second cap body 542.

Meanwhile, in the tab protection module 500, the formation positions of the fastening hook 580 and the hook groove 590 are not limited to the above embodiment, and it is also possible that the fastening hook 580 is provided on the second protection cap 540 and the hook groove 590 is provided to the first protection cap 520. In further examples, instead of a fastening hook 580, one of the first or second protection caps 520, 540 may include a mushroom cap shaped protrusion, which may be inserted into a receiving hole or orifice on the other of the protection caps, the mushroom cap shaped protrusion defining a ledge on its underside that may be caught and held securely after being inserted into the corresponding hole, thereby coupling the first and second protection caps 520, 540 to one another. In further examples, instead of the fastening hook, one of the first or second protection caps may include a butterfly anchor which may spread apart after being inserted into the corresponding hole or orifice of the other of the first or second protection caps 520, 540 to maintain a secure connection between the first and second protection caps 520, 540.

Meanwhile, referring to FIGS. 2 and 4, the tab protection module 500 may have a slit S formed in the upper portion and/or the lower portion thereof. The slit S may be formed when the tab protection module 500 comes into close contact with the cell body 110. The slit S may be formed in the first cap body 522 and/or the second cap body 542 of the tab protection module 500.

Specifically, the slit S may be a space formed between the first cap body 522 and the cell body 110 and/or between the second cap body 542 and the cell body 110 in the longitudinal direction (X-axis direction) of the battery cell 10 when the first cap wing 526 of the first protection cap 520 and the second cap wing 546 of the second protection cap 540 comes into close contact with the cell body 110. By the slit S, the tab protection module 500 may transfer the heat generated inside the battery cell 10 to the cell case 200 so that the heat is induced to be discharged to the outside of the battery cell 10.

Also, the inner space of the tab protection module 500 may be filled with a heat dissipation member (e.g., resin) (not shown). The heat dissipation member may entirely fill the inner space of the tab protection module 500 or partially fill the inner space of the tab protection module 500 by, for example, resin potting. In this case, in order to allow the injected resin to fill the inside of the tab protection module 500, the slit S may be formed in the upper portion or the lower portion of the tab protection module 500. That is, when the slit S is formed in the first protection cap 520, the slit S may not be formed in the second protection cap 540. Conversely, when the slit S is formed in the second protection cap 540, the slit S may not be formed in the first protection cap 520.

According to this embodiment, the heat generated in the battery cell 10, in particular, the heat generated in the coupling portion between the electrode tab 120 and the electrode lead 300, may be effectively discharged to the outside of the battery cell 10. In addition, according to this embodiment, since the space between the inner surface of the tab protection module 500 and the electrode tab 120 may be filled by the heat dissipation member, the stability of the coupling between the electrode tab 120 and the electrode lead 300 may be further reinforced.

Meanwhile, referring to FIGS. 2 and 4, the tab protection module 500 may be configured to be in close contact with the inner surface of the facing cell case 200.

For example, the first cap body 522 of the first protection cap 520 may be configured to be in close contact with the upper inner surface of the accommodation portion 220 facing the first cap body 522. In addition, the second cap body 542 of the second protection cap 540 may be configured to be closely coupled to the lower inner surface of the accommodation portion 220 facing the second cap body 542.

In addition, although not shown in detail, the first cap wing 526 of the first protection cap 520 and the second cap wing 546 of the second protection cap 540 may also be configured to be in close contact with the inner surface of the accommodation portion 220, respectively. As such, the tab protection module 500 may have a structure in which one side is in close contact with the inner surface of the cell case 200 and the other side is in close contact with the cell body 110, and accordingly, the tab protection module 500 may be stably fixed within the cell case 200.

Referring to FIGS. 2 and 4 continuously, the tab protection module 500 may have a curved portion R. This curved portion R may be in close contact with the inner surface of the facing cell case 200. Specifically, the curved portion R of the tab protection module 500 may have substantially the same radius of curvature as the inner surface of the accommodation portion 220 facing the curved portion R.

More specifically, the curved portion R may be formed on an edge portion of the tab protection module 500. In this case, the curved portion R may be formed on an edge portion of the first cap body 522 of the first protection cap 520 and an edge portion of the second cap body 542 of the second protection cap 540.

That is, the edge portion of the first cap body 522 and the edge portion of the second cap body 542 may be in close contact with the inner surface of the accommodation portion 220 facing the edge portions. In addition, the edge portion of the first cap body 522 and the edge portion of the second cap body 542 may have substantially the same radius of curvature as the inner surface of the accommodation portion 220 facing the edge portions.

Accordingly, the upper portion, the lower portion and the front portion of the tab protection module 500 may be fixed to the inner surface of the cell case 200 in a form of being in close contact with the inner surface of the accommodation portion 220 facing the same. That is, when the tab protection module 500 is accommodated in the cell case 200, the tab protection module 500 may be strongly fixed to the inner surface of the cell case 200, and thus it is possible to prevent a dead space from being generated between the inner surface of the cell case 200 and the outer surface of the tab protection module 500.

According to this embodiment, the tab protection module 500 may be more stably fixed in the cell case 200.

Meanwhile, the curved portion R may include a first curved surface R1, a second curved surface R2, and a third curved surface R3.

The first curved surface R1 may be formed on the front side (X-axis direction) of the tab protection module 500. Specifically, the first curved surface R1 may be formed on the front edge portion of the tab protection module 500. As an example, the first curved surface R1 may be formed on the front edge portion of the first cap body 522. Also, the first curved surface R1 may be formed on the front edge portion of the second cap body 522.

The second curved surface R2 may be formed on at least one side of both sides (both sides in the Y-axis direction) of the tab protection module 500. Specifically, the second curved surface R2 may be formed on at least one edge portion of both side edges of the tab protection module 500. As an example, the second curved surface R2 may be formed on at least one edge portion of both side edges of the first cap body 522. Also, the second curved surface R2 may be formed on at least one edge portion of both side edges of the second cap body 542.

The third curved surface R3 may be formed in a region where the first curved surface R1 and the second curved surface R2 meet. As an example, the third curved surface R3 may be formed in a region where the first curved surface R1 and the second curved surface R2 meet in the first cap body 522. Also, the third curved surface R3 may be formed in a region where the first curved surface R1 and the second curved surface R2 meet in the second cap body 542.

The first curved surface R1, the second curved surface R2, and the third curved surface R3 may be in close contact with the inner surface of the accommodation portion 220 facing the same. That is, the first curved surface R1, the second curved surface R2, and the third curved surface R3 may have substantially the same radius of curvature as the inner surface of the accommodation portion 220 facing the same.

According to this embodiment, since the curved portion R formed along the edge of the tab protection module 500 is in close contact with the inner surface of the facing cell case 200, the tab protection module 500 may be more stably fixed in the cell case 200.

Figure 12:
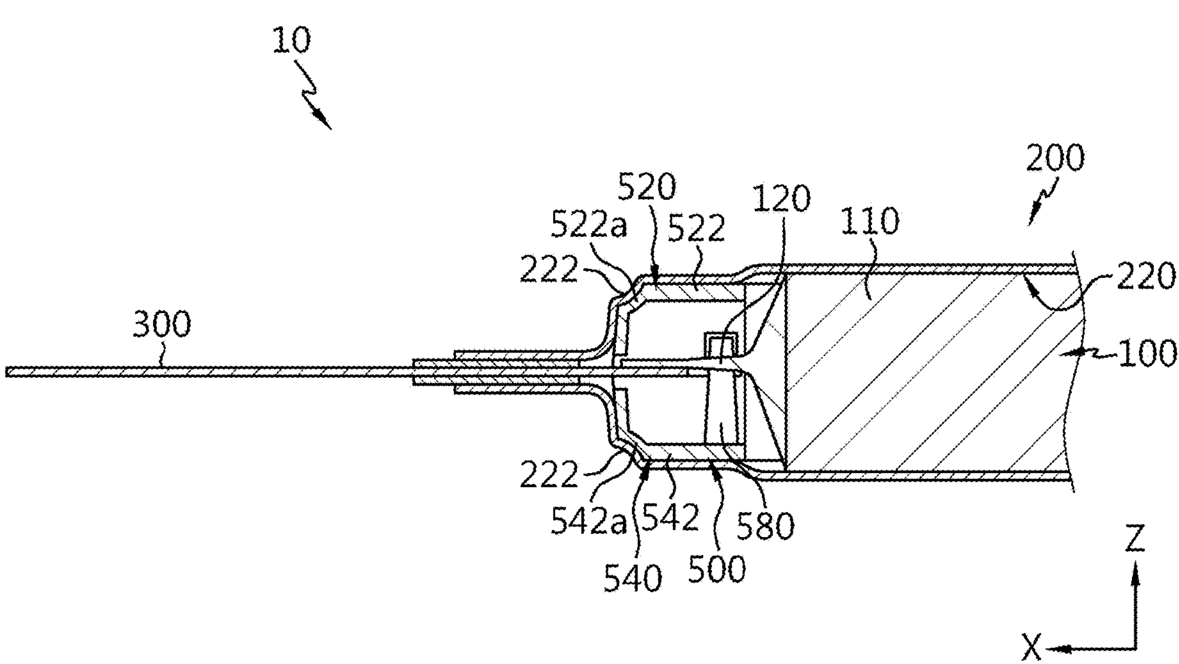
FIG. 12 is a side view showing the inside of the battery cell of FIG. 11.

Meanwhile, referring to FIG. 12, the cell case 200 of the present disclosure may include a protrusion 222. The protrusion 222 may be formed to protrude by a predetermined length from the inner surface of the cell case 200 toward the electrode assembly 100. Specifically, the protrusion 222 may be formed to protrude from the inner surface of the accommodation portion 220 toward the electrode assembly 100 by a predetermined length. In particular, the protrusion 222 may be provided in a region adjacent to the case terrace T. As an example, the protrusion 222 may be formed by a forming mold.

The tab protection module 500 may include recessed portions 522*a*, 542*a*. The recessed portions 522*a*, 542*a* may have a shape corresponding to the protrusion 222, and may be formed by being recessed by a predetermined depth from the outer surface of the tab protection module 500. The recessed portions 522*a*, 542*a* may have a concave shape. In particular, the recessed portions 522*a*, 542*a* may be provided in the edge portions of the first protection cap 520 and the second protection cap 540, respectively. In addition, the recessed portions 522*a*, 542*a* may be configured to receive at least a portion of the protrusion 222. The recessed portions 522*a*, 542*a* may be provided to the first cap body 522 and the second cap body 542 described above. The outer surface of the protrusion 222 and the outer surfaces of the recessed portions 522*a*, 542*a* may have approximately the same radius of curvature to come into close contact with each other.

According to this embodiment, the tab protection module 500 may be more stably fixed in the cell case 200.

Figure 13:
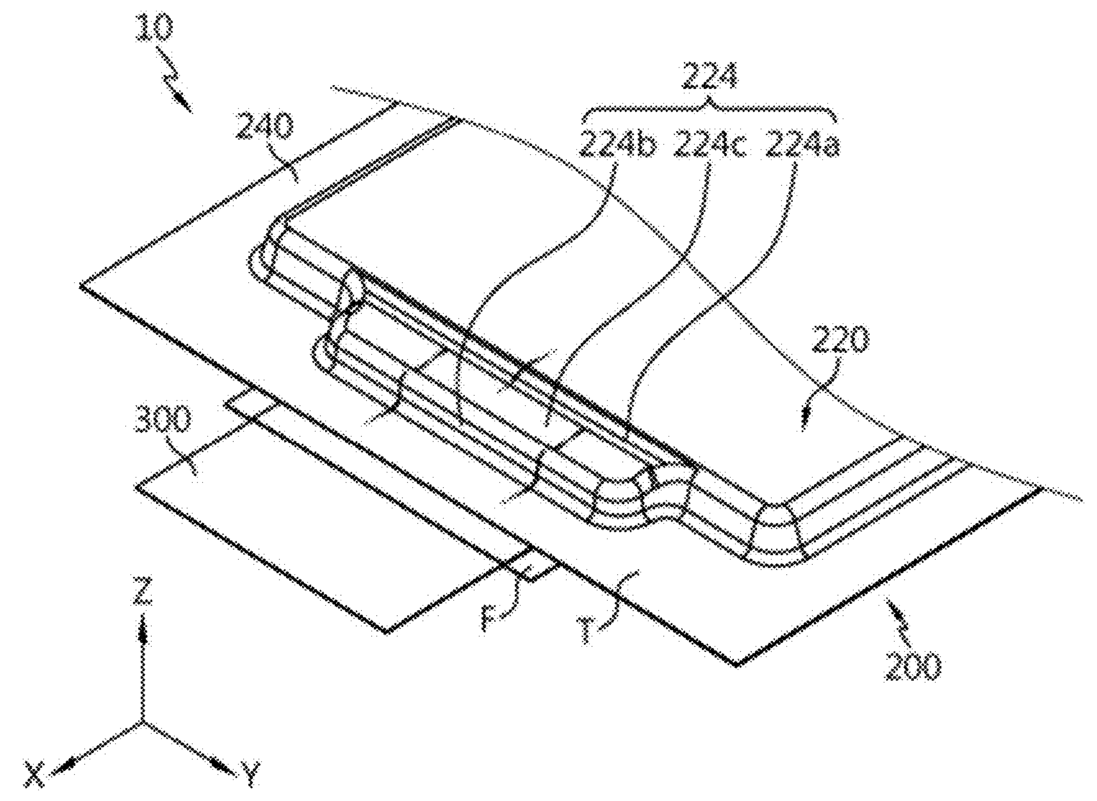
FIG. 13 is a diagram for illustrating a bent portion formed in the cell case of the present disclosure.
Figure 14:
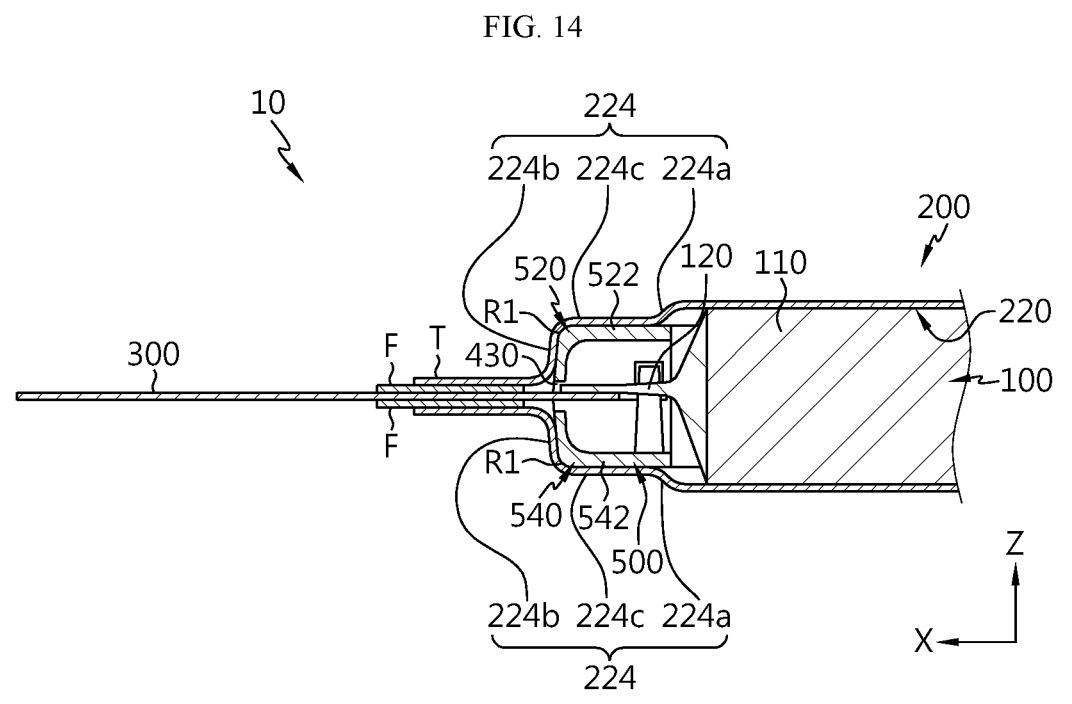

Meanwhile, referring to FIGS. 13 and 14, the cell case 200 may include a bent portion 224 formed by being bent in multiple stages.

The bent portion 224 may be formed in a region where the tab protection module 500 is disposed. The bent portion 224 may be formed by a forming mold. As an example, portions corresponding to the curved surface of the bent portion 224 formed by multi-stage bending may be configured to have a predetermined radius of curvature.

Meanwhile, the tab protection module 500 may be configured to be in close contact with the bent portion 224. Specifically, the first cap body 522 of the first protection cap 520 may be in close contact with the bent portion 224 of the accommodation portion 220 facing the first cap body 522. In addition, the second cap body 542 of the second protection cap 540 may be in close contact with the bent portion 224 of the accommodation portion 220 facing the second cap body 542.

Referring to FIGS. 13 and 14 continuously, the bent portion 224 may include a first inclined portion 224*a* and a second inclined portion 224*b*.

The first inclined portion 224*a* may be configured to face the electrode tab 120. In this case, the first inclined portion 224*a* may be spaced apart from the electrode tab 120 along the longitudinal direction (X-axis direction) of the battery cell 10.

The second inclined portion 224*b* may be configured to be in close contact with the tab protection module 500. In addition, the second inclined portion 224*b* may have a larger inclination angle than the first inclined portion 224*a* based on the extension direction (X-axis extension direction) of the electrode lead 300. In addition, the second inclined portion 224*b* may correspond to a region of the accommodation portion 220 connected to the case terrace T.

That is, the slope of the first inclined portion 224*a* facing the electrode tab 120 may be more gentle than the slope of the second inclined portion 224*b* facing the tab protection module 500. At this time, the curved portion R of the tab protection module 500 may have substantially the same radius of curvature as the inner surface of the cell case 200 facing the curved portion R. As an example, as shown in FIG. 14, the first curved surface R1 of the tab protection module 500 may be in close contact with the inner surface of the accommodation portion 220 facing the first curved surface R1.

According to this multi-stage bending structure, the height occupied by the tab protection module 500 may be minimized. Even if the tab protection module 500 applied to protect the electrode tab 120 has a height lower than the height occupied by the electrode assembly 100, the protection function of the electrode tab 120 is not affected. Therefore, it is possible to reduce the height occupied by the tab protection module 500 by applying the multi-stage bending structure, thereby increasing the energy density. In addition, in this multi-stage bending structure, by configuring the second inclined portion 224*b* to have a larger slope compared to the first inclined portion 224*a*, the effect that the cell case 200 compresses and fixes the tab protection module 500 toward the cell body 110 may be increased Meanwhile, the bent portion 224 may further include a connection portion 224*c*. The connection portion 224*c* may be configured to connect the first inclined portion 224*a* and the second inclined portion 224*b* to each other and to be in close contact with the tab protection module 500 in upper and lower direction.

More specifically, the connection portion 224*c* may be formed to extend in the longitudinal direction (X-axis direction) of the battery cell 10. In addition, the connection portion 224*c* may be in close contact with the upper portion of the first cap body 522 and the lower portion of the second cap body 542 of the tab protection module 500, respectively.

Figure 7:
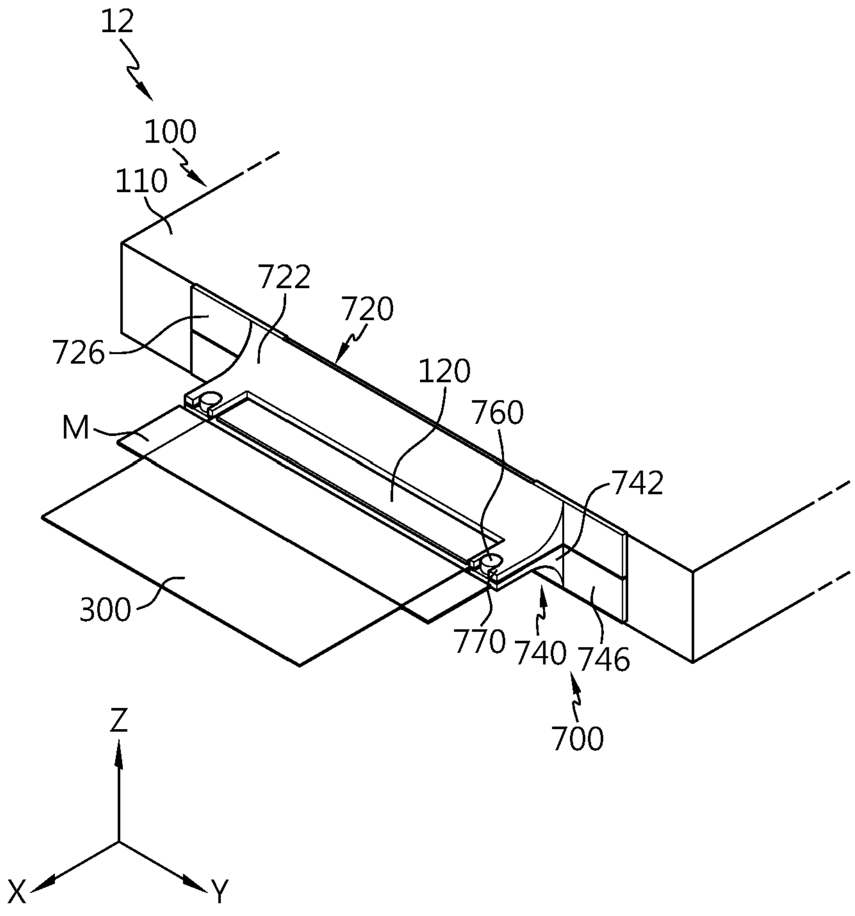
FIG. 7 is a diagram for illustrating a battery cell according to another embodiment of the present disclosure.
Figure 8:
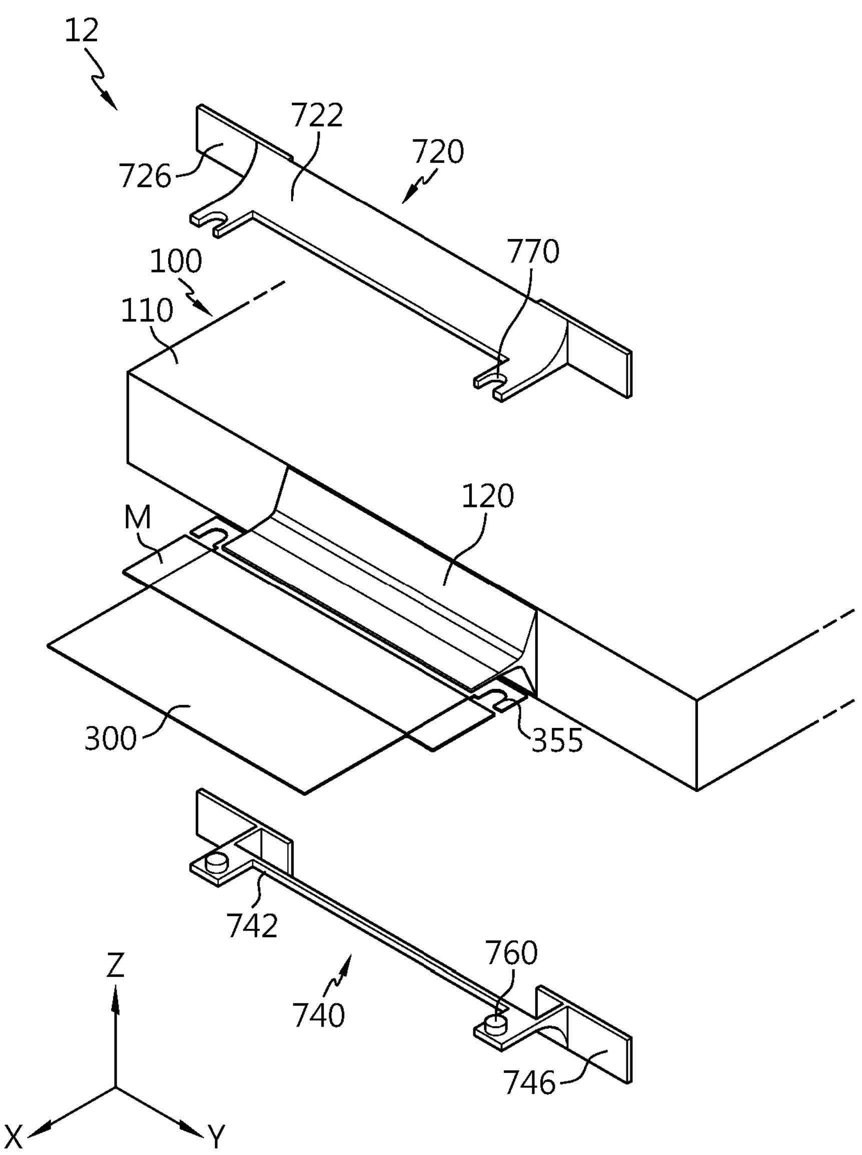
FIG. 8 is an exploded perspective view showing the battery cell of FIG. 7.

FIG. 7 is a diagram for illustrating a battery cell 12 according to another embodiment of the present disclosure, and FIG. 8 is an exploded perspective view showing the battery cell 12 of FIG. 7. In FIGS. 7 and 8, for convenience of explanation, the cell case 200 described above is not depicted in the battery cell 12.

Since the battery cell 12 according to this embodiment is similar to the battery cell 10 of the former embodiment, components substantially identical or similar to those of the former embodiment will not be described again, and features different from those of the former embodiment will be described in detail.

Referring to FIGS. 7 and 8, the tab protection module 700 of the battery cell 12 may include a first protection cap 720 and a second protection cap 740.

The first protection cap 720 and the second protection cap 740 may be coupled to each other in the upper and lower direction to at least partially cover the electrode tab 120.

The tab protection module 700 may include a lead positioning guide 760 and a positioning guide insert portion 770.

The lead positioning guide 760 may be provided on any one of the first protection cap 720 and the second protection cap 740. As an example, the lead positioning guide 760 may be provided on the upper side of the second protection cap 740. In particular, the lead positioning guide 760 may protrude by a predetermined height from the upper surface of the second cap body 742 of the second protection cap 740, and may fix the position of the electrode lead 300 relative to the tab protection module 700.

The positioning guide insert portion 770 may be coupled to the lead positioning guide 760 in the upper and lower direction to guide the fixation of the electrode lead 300 inside the cell case 200. In one embodiment, the positioning guide insert portion 770 may be provided on the first protection cap 720. The shape of the positioning guide insert portion 770 may be variously configured. As an example, the positioning guide insert portion 770 may be formed in a groove shape or may define a hole, indentation, recess, or the like.

Specifically, the positioning guide insert portion 770 may be configured to surround at least a part of the side surface of the lead positioning guide 760. That is, the positioning guide insert portion 770 may define a semi-circle or a U-shape so that the inner surface of the positioning guide insert portion 770 may be placed on or around the corresponding lead positioning guide 760 to couple the first protection cap 720 and the second protection cap 740. In this case, when viewed in the upper and lower direction, both side edges of the electrode lead 300 may be disposed between the first cap body 722 of the first protection cap 720 and the second cap body 742 of the second protection cap 740.

More specifically, since the positioning guide insert portion 770 is configured to surround at least a part of the lead positioning guide 760, when the lead positioning guide 760 and the positioning guide insert portion 770 are coupled, the positions of both side edges of the electrode lead 300 disposed between the first protection cap 720 and the second protection cap 740 may be fixed more stably in the upper and lower direction (Z-axis direction), in the front and rear direction (X-axis direction) and in the left and right direction (Y-axis direction) of the battery cell 10.

Referring to FIGS. 7 and 8 again, a guide insert portion 355 may be formed at both side edges of the electrode lead 300 so as to be inserted onto each lead positioning guide 760. Also, the guide insert portion 355 may have a shape corresponding to the positioning guide insert portion 770. The shape of the guide insert portion 355 may be variously configured. As an example, the guide insert portion 355 may be formed in a groove shape or may define a hole, indentation, recess, or the like.

According to this embodiment, when the lead positioning guide 760 and the positioning guide insert portion 770 are coupled, movement of both side edges of the electrode lead 300 disposed between the first protection cap 720 and the second protection cap 740 in the upper and lower direction (Z-axis direction), in the front and rear direction (X-axis direction) and in the left and right direction (Y-axis direction) of the battery cell 10 may be more reliably restricted. Accordingly, the position of the electrode lead 300 inside the cell case 200 may be more stably fixed.

Meanwhile, in the battery cell 12 according to this embodiment, the first protection cap 720 and the second protection cap 740 may be configured to be at least partially in close contact with a portion S of one side of the cell body 110 where the electrode tab 120 is not positioned, after being coupled with each other. As an example, the first cap wing 726 of the first protection cap 720 and the second cap wing 746 of the second protection cap 740 may be configured to be in close contact with one side of the cell body 110 at portions of the side of the cell body 110 surrounding the portion in which the electrode tab 120 is positioned.

In addition, the first protection cap 720 and the second protection cap 740 may be additionally fixed using an adhesion or the like after being at least partially in close contact with one side of the cell body 110.

In the battery cell 12 according to this embodiment, the first protection cap 720 and the second protection cap 740 may be coupled with each other only by coupling the lead positioning guide 760 and the positioning guide insert portion 770.

Therefore, in the battery cell 12 according to this embodiment, the tab protection module 700 may be assembled only by assembling the lead positioning guide 760 and the positioning guide insert portion 770 without a separate coupling structure for coupling the first protection cap 720 and the second protection cap 740. Accordingly, in the battery cell 12 according to this embodiment, the position of the electrode lead 300 inside the cell case 200 may be fixed while securing the mutual assembly of the first protection cap 720 and the second protection cap 740 with a simpler structure. In alternative examples, the lead positioning guide 760 may have a mushroom cap shape, similar the embodiment described above, so that the positioning guide insert portion 770 cannot decouple from the lead positioning guide 760 in the Z-direction. In still further examples, the positioning guide insert portion 770 may include deformable tabs on its interior surface so that the positioning guide insert portion 770 can be inserted or applied onto the lead positioning guide 760 by slightly deforming the tabs, then passing the protrusion of the lead positioning guide 760 through the tabs of the positioning guide insertion portion 770 and allowing the tabs to retake their shape to come together and prevent decoupling of the first protection cap

720 and the second protection cap 740 in the X-direction. Alternatively, rather than the lead positioning guide 760 having to pass beyond the tabs, the lead positioning guide 760 may define slits or recesses which correspond to the deformable (or non-deformable) tabs so that the tabs of the positioning guide insertion portion 770 may be disposed within the slits of the lead positioning guide 760 to couple the first protection cap 720 to the second protection cap 740. In such a case, the first protection cap 720 may be coupled to the second protection cap 740 in either the X-direction or the Z-direction.

Figure 9:
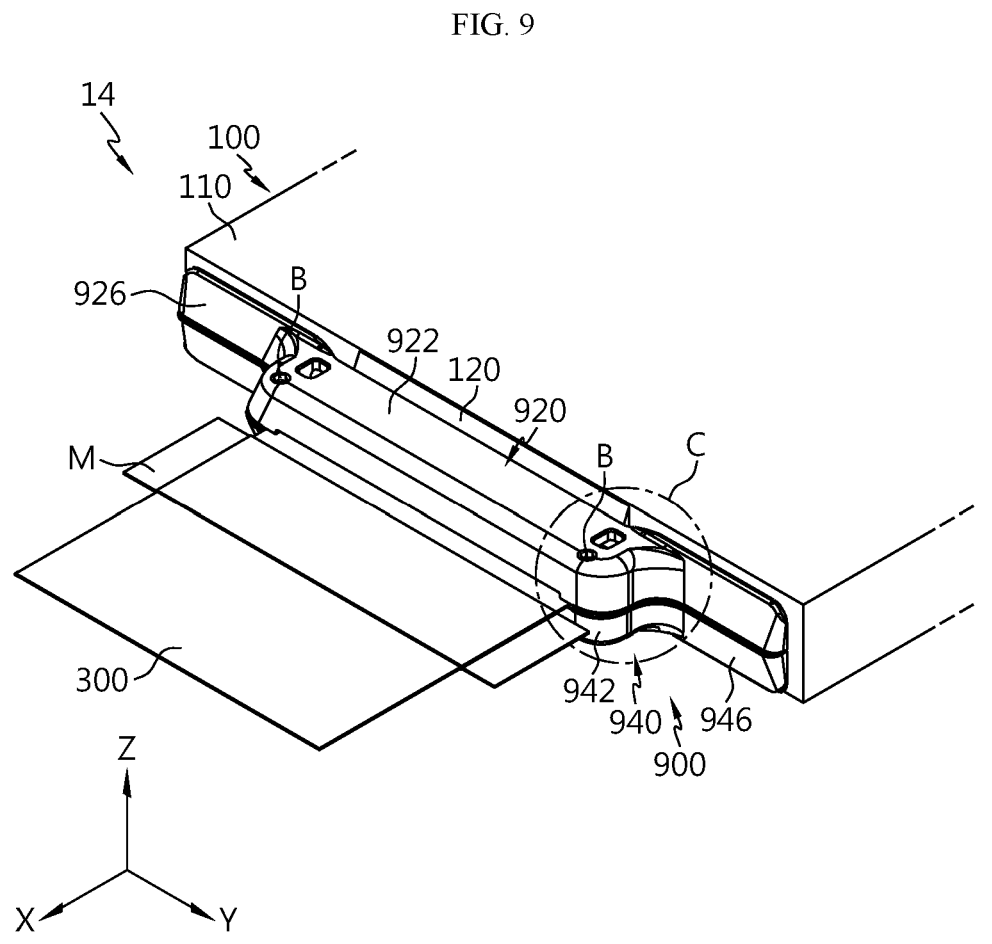
Figure 11:
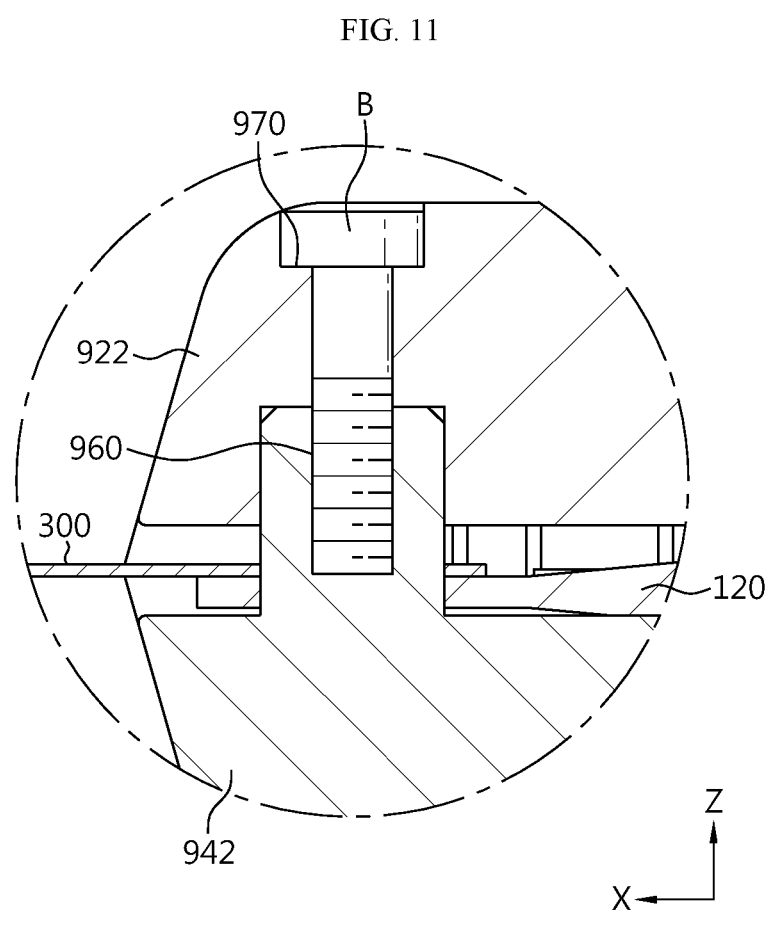

FIG. 9 is a diagram for illustrating a battery cell 14 according to still another embodiment of the present disclosure, FIG. 10 is an exploded perspective view showing the battery cell 14 of FIG. 9, and FIG. 11 is an enlarged cross-sectional view showing a region C of FIG. 9. In FIGS. 9 and 10, for convenience of explanation, the cell case 200 described above is not depicted in the battery cell 14.

Since the battery cell 14 according to this embodiment is similar to the battery cell 10 of the former embodiment, components substantially identical or similar to those of the former embodiment will not be described again, and features different from those of the former embodiment will be described in detail.

Referring to FIGS. 9 to 11, the tab protection module 900 of the battery cell 14 may include a first protection cap 920 and a second protection cap 940.

The tab protection module 900 may include a lead positioning guide 960 and a positioning guide insert portion 970.

The lead positioning guide 960 may be provided to any one of the first protection cap 920 and the second protection cap 940. As an example, the lead positioning guide 960 may be provided at the upper side of the second protection cap 940. In particular, the lead positioning guide 960 may protrude by a predetermined height from the upper surface of the second cap body 942 of the second protection cap 940 and fix the edge of the electrode lead 300 to the tab protection module 900.

The positioning guide insert portion 970 may be coupled to the lead positioning guide 960 in the upper and lower direction to guide the fixation of the electrode lead 300 inside the cell case 200. In one embodiment, the positioning guide insert portion 970 may be provided on the first protection cap 920. In particular, the positioning guide insert portion 970 may be formed by a predetermined depth at the lower surface of the first cap body 922 of the first protection cap 920. The shape of the positioning guide insert portion 970 may be variously configured. As an example, the positioning guide insert portion 970 may be formed in a groove shape or may define a hole, indentation, recess, or the like.

In addition, the tab protection module 900 may further include a fixing member B configured to fix the lead positioning guide 960 and the positioning guide insert portion 970 to each other in the upper and lower direction. As an example, the fixing member B may fix the positioning guide insert portion 970 provided on the first protection cap 920 to the lead positioning guide 960 provided at the second protection cap 940. To this end, the fixing member B may be inserted into the lead positioning guide 960 through the positioning guide insert portion 970. The fixing member B may be a bolt, screw, nail, pin, peg, or the like, but is not limited thereto.

According to this embodiment, the lead positioning guide 960 and the positioning guide insert portion 970 may be coupled more stably. Accordingly, the positions of both side edges of the electrode lead 300 in the upper and lower direction (Z-axis direction), in the front and rear direction (X-axis direction) and in the left and right direction (Y-axis direction) of the battery cell 10 may be fixed more stably.

Meanwhile, in the battery cell 14 according to this embodiment, the first protection cap 920 and the second protection cap 940 may be configured to be at least partially in close contact with one side of the cell body 110 at portion S of the side of the cell body 110 in which the electrode tab 120 is not positioned, after being coupled with each other. As an example, the first cap wing 926 of the first protection cap 920 and the second cap wing 946 of the second protection cap 940 may be configured to be in close contact with one side of the cell body 110 at portion S of that side of the cell body 110 surrounding the portion of the side of the cell body 110 in which the electrode tab 120 is not positioned.

Meanwhile, one or more battery cells 10, 12, 14 according to the present disclosure may be provided to constitute a battery module. That is, the battery module according to the present disclosure may include one or more battery cells 10, 12, 14 according to the present disclosure. Specifically, one or more battery cells 10, 12, 14 may constitute a cell assembly, and the cell assembly may be accommodated in a module case.

In addition, at least one battery module according to the present disclosure may be provided to configure the battery pack. That is, the battery pack according to the present disclosure may include at least one battery module according to the present disclosure. In addition, the battery pack may further include a pack case for accommodating the battery module therein and various devices for controlling the charging and discharging of the battery pack, for example a battery management system (BMS), a current sensor and a fuse. In addition, the battery pack according to the present disclosure may be applied to a vehicle, such as an electric vehicle. That is, the vehicle according to the present disclosure may include at least one battery pack according to the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms indicating directions such as “upper”, “lower”, “left”, “right”, “front” and “rear” are used herein, these terms are selected just for convenience of description only, and it is obvious to those skilled in the art that these terms may change depending on the position of the stated element or an observer.

REFERENCE SIGNS

10, 12, 14: battery cell
100: electrode assembly
110: cell body
120: electrode tab
200: cell case
220: accommodation portion
240: sealing portion
T: case terrace
300: electrode lead
350, 355: guide insert portion
500: tab protection module
560: lead positioning guide
570: positioning guide insert portion
M: lead film 700: tab protection module
760: lead positioning guide
770: positioning guide insert portion
900: tab protection module
960: lead positioning guide
970: positioning guide insert portion
B: fixing member

What is claimed is:

1. A battery cell, comprising:

an electrode assembly including a cell body and an electrode tab provided to at least one side of the cell body;

a cell case configured to accommodate the electrode assembly therein;

an electrode lead coupled to the electrode tab and extending from the cell case; and a tab protection module accommodated in the cell case and configured to cover at least a portion of the electrode tab, the tab protection module including a lead positioning guide and a corresponding positioning guide insert portion defining a recess adapted to receive the lead positioning guide, wherein the lead positioning guide is configured to couple to the electrode lead to guide a position of the electrode lead relative to the cell case, and wherein the tab protection module is positioned such that at least a portion of the tab protection module contacts the cell body.

2. The battery cell according to claim 1, wherein the lead positioning guide is configured to fix the position of the electrode lead relative to the cell case.

3. The battery cell according to claim 1, wherein the lead positioning guide includes a pair of lead positioning guides, and the pair of lead positioning guides are configured to guide positioning of opposing side edges of the electrode lead.

4. The battery cell according to claim 3, wherein the positioning guide insert portion includes a pair of positioning guide insert portions, each positioning guide insert portion of the pair of positioning guide insert portions being adapted to receive a corresponding lead positioning guide of the pair of lead positioning guides.

5. The battery cell according to claim 3, wherein the electrode lead defines a pair of guide insert portions, each guide insert portion of the pair of guide insert portions being formed along each of the opposing side edges of the electrode lead, each guide insert portion being sized and shaped to receive each of the pair of lead positioning guides.

6. The battery cell according to claim 5, wherein one end of the electrode tab coupled to the electrode lead is disposed between the pair of guide insert portions.

7. The battery cell according to claim 1, wherein the positioning guide insert portion is configured to surround at least a part of a side surface of the lead positioning guide.

8. The battery cell according to claim 7, wherein each guide insert portion of the pair of guide insert portions defines a shape corresponding to a shape of the positioning guide insert portion.

9. The battery cell according to claim 1, further comprising:

a fixing member configured to fix the lead positioning guide and the positioning guide insert portion to each other.

10. The battery cell according to claim 1, wherein the tab protection module is disposed between an inner surface of the cell case and the electrode assembly, a first end of the tab protection module is positioned on at least one side of the electrode assembly, a second end of the tab protection module is positioned at a coupling portion between the electrode tab and the electrode lead, and the electrode tab is configured to be at least partially surrounded by the tab protection module between the first end of the tab protection module and the second end of the tab protection module.

11. The battery cell according to claim 10, wherein the coupling portion between the electrode tab and the electrode lead is located within the tab protection module.

12. The battery cell according to claim 1, wherein the cell case includes:

an accommodation portion configured to accommodate the electrode assembly therein; and a sealing portion extending outward from the accommodation portion by a predetermined length;

wherein the sealing portion includes a case terrace located in a direction along which the electrode lead extends, wherein the tab protection module defines a shape corresponding to an inner surface of the accommodation portion adjacent to the case terrace.

13. The battery cell according to claim 12, further comprising:

a lead film interposed between the electrode lead and the case terrace, wherein the tab protection module is disposed between the lead film and the electrode assembly.

14. The battery cell according to claim 1, wherein the tab protection module is provided on at least one side of the cell body and configured to at least partially cover an upper side and a lower side of the electrode tab.

15. A battery module, comprising at least one battery cell according to claim 1.

16. A battery pack, comprising at least one battery module according to claim 15.

17. A vehicle, comprising at least one battery pack according to claim 16.

18. A battery cell, comprising:

an electrode assembly including a cell body and an electrode tab extending from at least one side of the cell body;

a cell case configured to accommodate the electrode assembly therein;

an electrode lead coupled to the electrode tab and extending from the cell case; and a tab protection module accommodated in the cell case and configured to cover at least a portion of the electrode tab, the tab protection module including a lead positioning guide configured to pass through the electrode lead from a first side of the electrode lead to a second opposing side of the electrode lead to guide the fixation of both side edges of the electrode lead, wherein the tab protection module is positioned such that at least a portion of the tab protection module contacts the cell body of the electrode assembly.

19. A battery cell, comprising:

an electrode assembly including a cell body and an electrode tab provided to at least one side of the cell body;

a cell case configured to accommodate the electrode assembly therein;

an electrode lead coupled to the electrode tab and extending from the cell case; and a tab protection module accommodated in the cell case and configured to cover at least a portion of the electrode tab, the tab protection module including a lead positioning guide and a corresponding positioning guide insert portion adapted to receive the lead positioning guide, wherein the lead positioning guide is configured to couple to the electrode lead to guide a position of the electrode lead relative to the cell case, wherein the lead positioning guide includes a pair of lead positioning guides, and the pair of lead positioning guides are configured to guide positioning of opposing side edges of the electrode lead, and wherein the positioning guide insert portion includes a pair of positioning guide insert portions, each positioning guide insert portion of the pair of positioning guide insert portions being adapted to receive a corresponding lead positioning guide of the pair of lead positioning guides.

* * * * *